(12) United States Patent
Ono

(10) Patent No.: US 7,721,244 B2
(45) Date of Patent: May 18, 2010

(54) LSI CIRCUIT DESIGNING SYSTEM, ANTENNA DAMAGE PREVENTING METHOD AND PREVENTION CONTROLLING PROGRAM USED IN SAME

(75) Inventor: Koki Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 378 days.

(21) Appl. No.: 11/730,211

(22) Filed: Mar. 30, 2007

(65) Prior Publication Data

US 2007/0234264 A1     Oct. 4, 2007

(30) Foreign Application Priority Data

Mar. 31, 2006   (JP)  ............... 2006-101180
Mar. 1, 2007   (JP)  ............... 2007-052095

(51) Int. Cl.
    *G06F 17/50*      (2006.01)

(52) U.S. Cl. ............... 716/12; 716/2; 716/11; 716/19; 703/14

(58) Field of Classification Search ...... 716/2, 716/11, 12, 19
See application file for complete search history.

(56) References Cited

U.S. PATENT DOCUMENTS

2006/0115911 A1*   6/2006   Itou et al. .............. 438/18

FOREIGN PATENT DOCUMENTS

| | | |
|---|---|---|
| JP | 2000-114383 | 4/2000 |
| JP | 2001-102458 | 4/2001 |
| JP | 2001-223275 | 8/2001 |

OTHER PUBLICATIONS

Japanese Patent Office issued a Japanese Office Action dated Feb. 2, 2010, Application No. 2007-052095.

* cited by examiner

*Primary Examiner*—Thuan Do
(74) *Attorney, Agent, or Firm*—Young & Thompson

(57) ABSTRACT

An LSI (Large-Scale Integrated) circuit system capable of preventing antenna damage occurring in MOS (Metal Oxide Semiconductor) transistors due to an erroneous operation of a wiring formed during manufacturing processes of LSIs or like as an antenna. Layout data after installation of wirings is read by layout reading processing and up-sizing candidate table is created by sizing candidate table creating processing using various libraries so that candidate values are arranged for every function cell in ascending order of gate areas. By antenna error net detecting processing, a net having wiring layers causing an antenna error is detected. A gate pin, its instance, type of a cell connected to the net is recognized by gate pin/cell recognizing processing and a cell enabling prevention of an antenna error is up-sized by cell sizing processing by referring to a gate area stored in an up-sizing candidate table.

17 Claims, 17 Drawing Sheets

FIG. 4

22: Layout Library

MACRO BUF1W
PIN IN
Gate Area 1
...
MACRO BUF2W
PIN IN
Gate Area 1
...
MACRO BUF6W
PIN IN
Gate Area 2
...

23: Logic Library

Cell(BUF1W) {
Area : 3 ; Function : "OUT = IN";
...
}
Cell(BUF2W) {
Area : 4 ; Function : "OUT = IN";
...
}
Cell(BUF6W) {
Area : 7 ; Function : "OUT = IN";
...
}

Function : "OUT = IN", Pin : IN

| Cell | Cell Area | Gate Area |
|------|-----------|-----------|
| BUF1W | 3 | 1 |
| BUF6W | 7 | 2 |

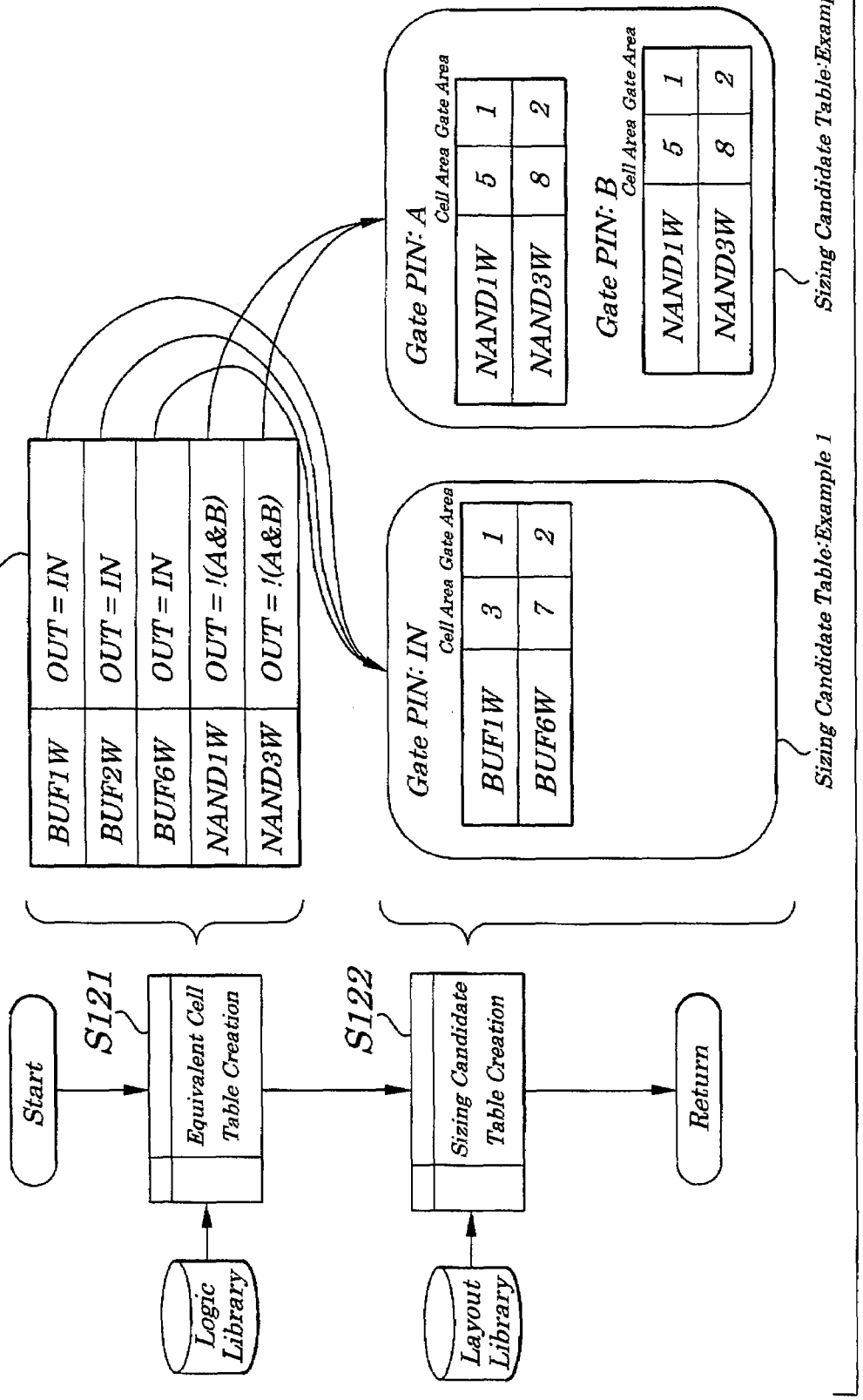

FIG.6A
⟨Example of Detected Antenna Error⟩ ⟷ Actual Net List Connection

| NET | Antenna Reference Value | Σ Metal Area | Error | Fanout (instance/pin) | | |
|---|---|---|---|---|---|---|
| A | 3000 | 4500 | 1500 (M5) | insA/IN (BUF1W) | | |
| B | 2000 | 5000 | 500 (M6) | | insB/B (NAND1W) | insC/IN (BUF1W) |
| | 2000 | 8000 | 2000 (M7) | | | |

FIG.6B
⟨After Correction up to M6 Error in Net B⟩

| NET | Antenna Reference Value | Σ Metal Area | Error | Fanout (instance/pin) | | |
|---|---|---|---|---|---|---|
| A | 3000 | 6000 | OK (M5) | insA/IN (BUF6W) | | |
| B | 2000 | 5000 | OK (M6) | | insB/B (NAND3W) | insC/IN (BUF1W) |
| | 2000 | 8000 | 666 (M7) | | | |

FIG.6C
⟨After Correction to All Errors in Net B⟩

| NET | Antenna Reference Value | Σ Metal Area | Error | Fanout (instance/pin) | | |
|---|---|---|---|---|---|---|
| A | 3000 | 6000 | OK (M5) | insA/IN (BUF6W) | | |
| B | 2000 | 5000 | OK (M6) | | insB/B (NAND3W) | insC/IN (BUF6W) |
| | 2000 | 8000 | OK (M7) | | | |

35: Layout Library

Preventing Cell "MACRO"
PIN IN
"Gate Area 1"
"With Diffusion Pin Connected"

FIG.12A
(Example of Detected Antenna Error) ⇕ Actual Net List Connection

| NET | Antenna Reference Value | Σ Metal Area | Error | Fanin | Fanout (instance/pin) | | |
|---|---|---|---|---|---|---|---|
| A | 1500 | 4500 | 3000 (M5) | ○ | insA/IN (BUF1W) | | |
| B | 1000 | 5000 | 4000 (M6) | ○ | insB/B (NAND1W) | insC/IN (BUF1W) | |
|   | 2000 | 8000 | 2000 (M7) |   |   |   |   |

FIG.12B
(After Correction up to M5 Error in Net A)

| NET | Antenna Reference Value | Σ Metal Area | Error | Fanin | Fanout (instance/pin) | | |
|---|---|---|---|---|---|---|---|
| A | 3000 | 4500 | OK (M5) | ○ | insA/IN (BUF1W) | Preventing Cell A1 | |
| B | 1000 | 5000 | 4000 (M6) | ○ | insB/B (NAND1W) | insC/IN (BUF1W) | |
|   | 2000 | 8000 | 2000 (M7) |   |   |   |   |

FIG.12C
(After Correction to All Errors in Net B)

| NET | Antenna Reference Value | Σ Metal Area | Error | Fanin | Fanout (instance/pin) | | | |
|---|---|---|---|---|---|---|---|---|
| A | 3000 | 4500 | OK (M5) | ○ | insA/IN (BUF1W) | Preventing Cell A1 | | |
| B | 2000 | 5000 | OK (M6) | ○ | insB/B (NAND1W) | insC/IN (BUF1W) | Preventing Cell B1 | Preventing Cell B2 |
|   | 2000 | 8000 | OK (M7) |   |   |   |   |   |

FIG.13

| Numbers of Preventing Cell Connected | 1 piece | 2 pieces | 3 pieces |
|---|---|---|---|
| Relaxation of Reference Value in Intermediate Layer | About Four-fold | About Six-fold | About Eight-fold |
| Relaxation of Reference Value in Uppermost Layer | About Two-fold | About Three-fold | About Four-fold |

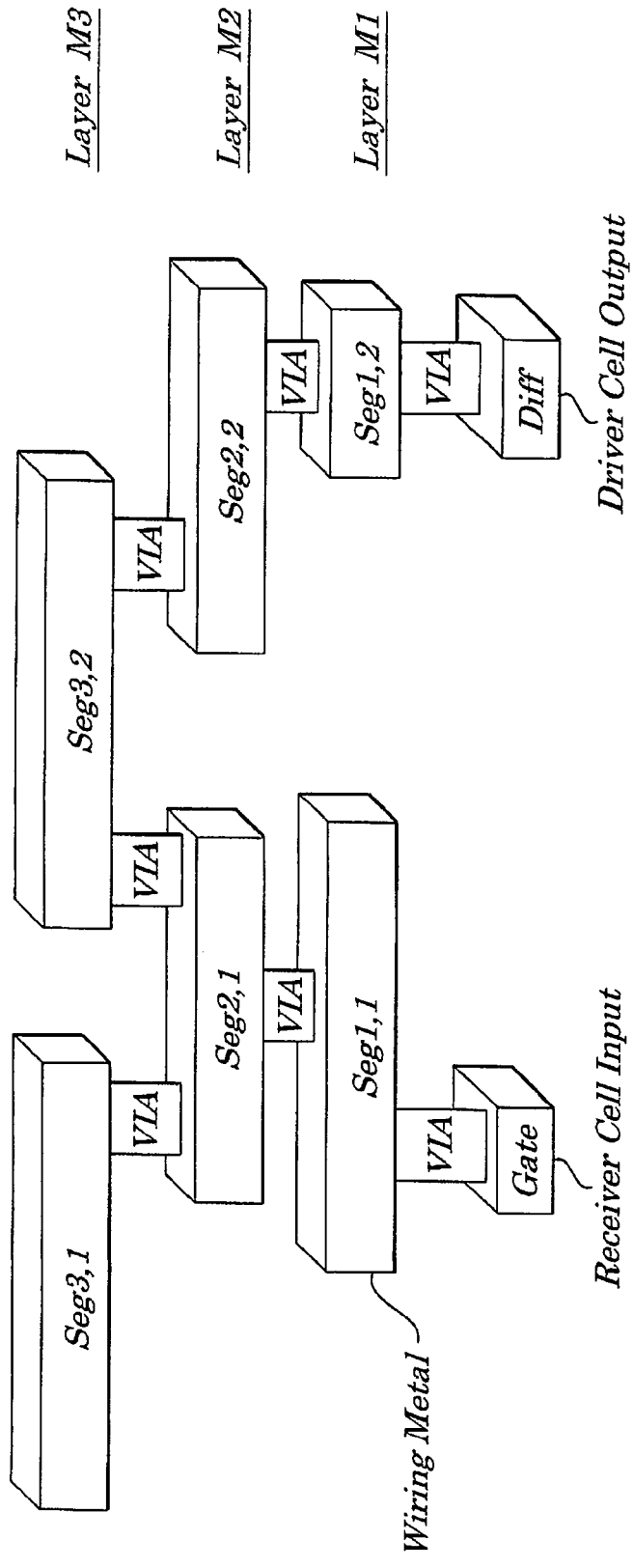

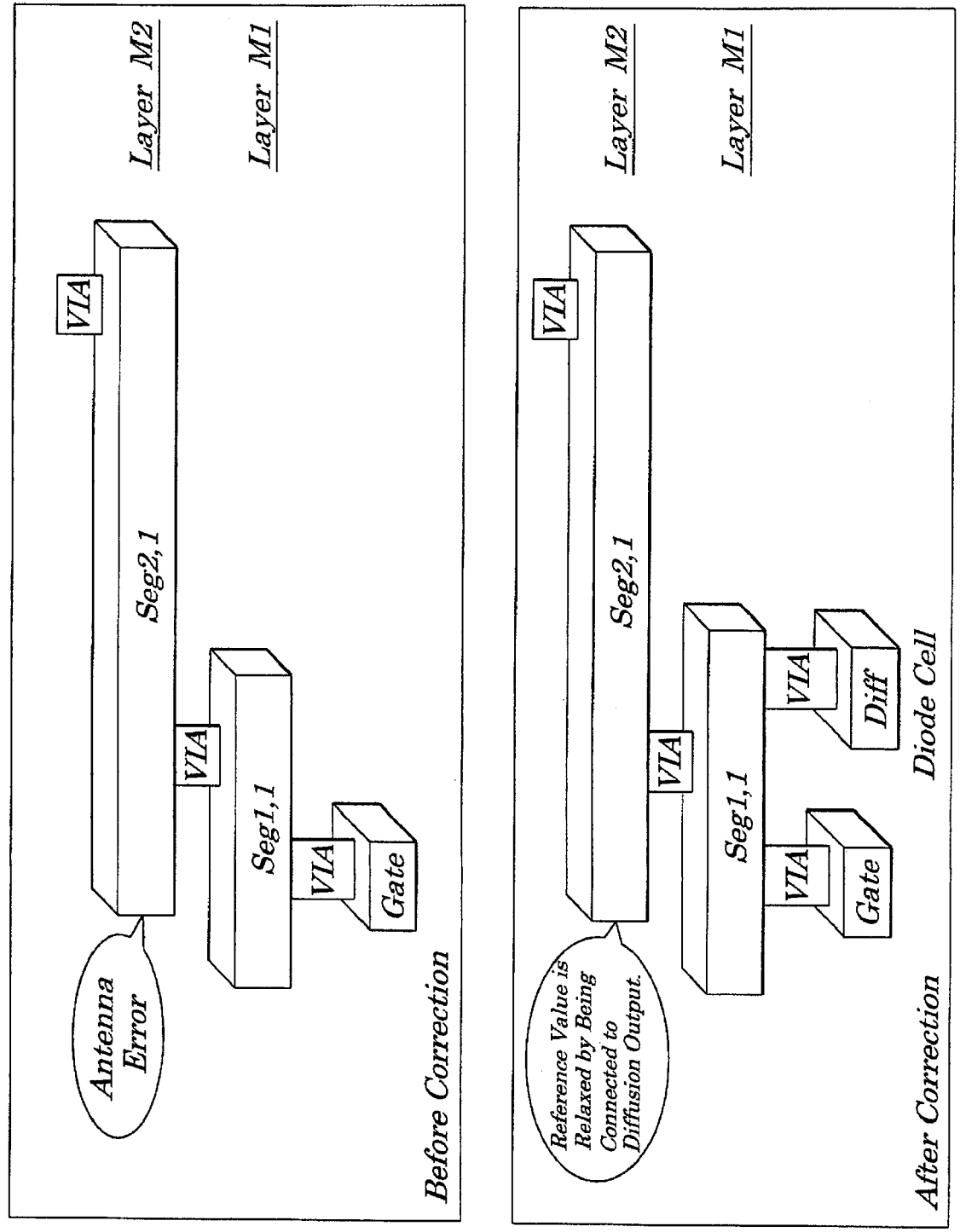
FIG.16A (RELATED ART) Before Correction
FIG.16B (RELATED ART) After Correction

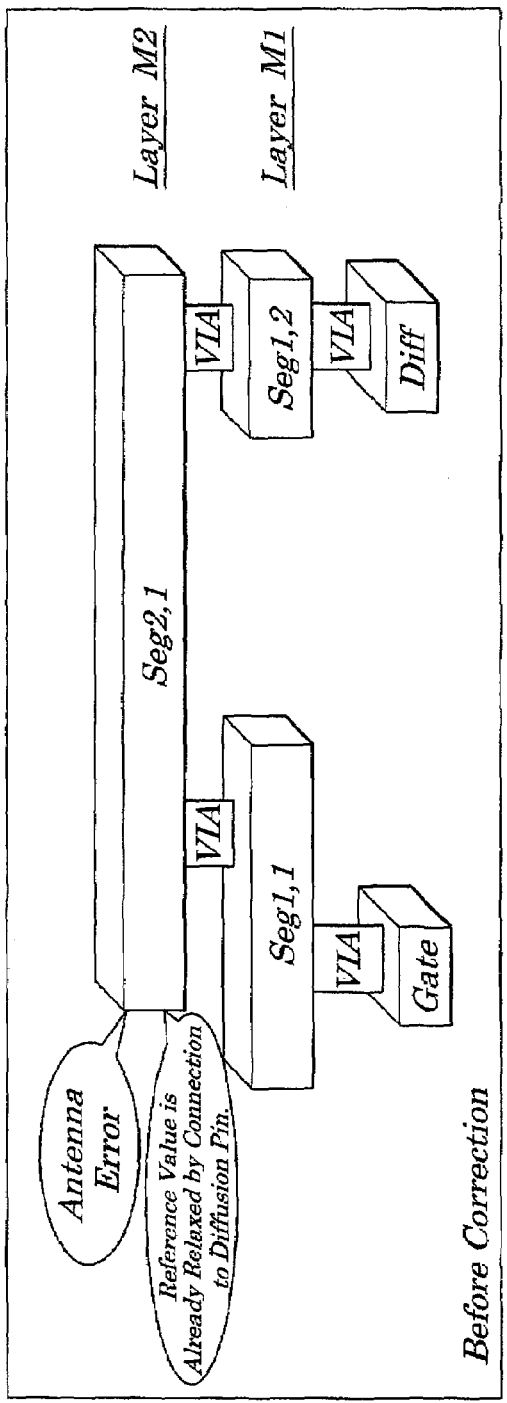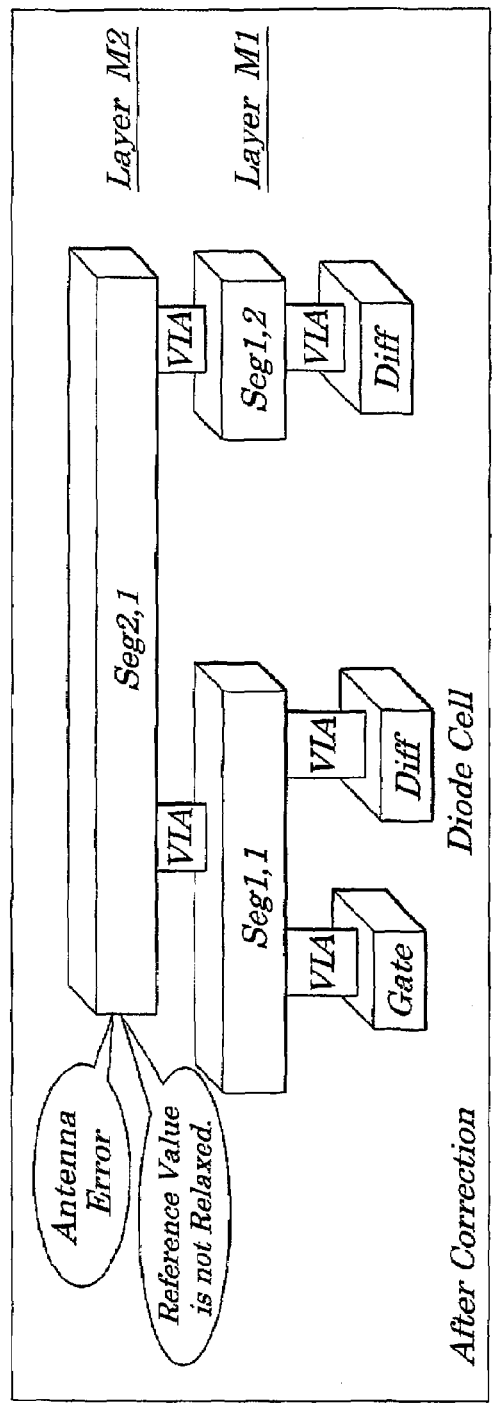
FIG. 17A (RELATED ART)
FIG. 17B (RELATED ART)

LSI CIRCUIT DESIGNING SYSTEM, ANTENNA DAMAGE PREVENTING METHOD AND PREVENTION CONTROLLING PROGRAM USED IN SAME

BACKGROUND OF THE INVENTION

1. Field of the Invention

The present invention relates to an LSI (Large-Scale Integrated) circuit designing system, an antenna damage preventing method, and an antenna damage prevention controlling program used in the LSI circuit designing system and more particularly to the LSI circuit designing system suitably used in the LSI circuit designing system capable of preventing antenna damage, which is caused by a wiring erroneously operating as an antenna in some cases formed during processes of manufacturing a semiconductor integrated circuit such as the LSI, occurring in a gate insulating film (for example, a gate oxide film of a MOS [Metal Oxide Semiconductor]) transistor making up a MIS (Metal Insulator Semiconductor) transistor mounted internally in the LSI, to the antenna damage preventing method and to the antenna damage prevention controlling program to be used for the LSI circuit designing system.

The present application claims priorities of Japanese Patent Application Nos. 2006-101180 filed on Mar. 31, 2006 and 2007-052095 filed on Mar. 1, 2007, which are hereby incorporated by reference.

2. Description of the Related Art

Conventionally, in wiring metal layer processing at a time of manufacturing semiconductor integrated circuits such as LSIs, there are some cases in which a wiring segment, due to the reason that it erroneously operates as an antenna, absorbs electrostatic charges during the processing of plasma etching, which is then discharged, when the charges exceed a specified level, through a gate electrode of each of MOS transistors connected to the above wiring segment and, as a result, the electrostatic charges cause damage to a gate oxide film of each of the MOS transistors. For example, in the case of wiring configurations as shown in FIG. 14, in the process of forming the wiring layer (Layer M1), a wiring segment (Seg. 1, 1), due to its connection to a gate pin (Gate) through a via (VIA), is a metal that may cause gate damage (hereinafter the metal segment causing gate damage being referred to as an "antenna object") and a wiring segment (Seg. 1, 2), owing to non-connection to a gate pin, is not a metal that may cause gate damage (hereinafter the metal segment causing no gate damage being referred to as an "antenna non-object").

Similarly, in the process of forming a Layer M2, a wiring Seg. 2, 1 is an antenna object and a wiring Seg. 2, 2 is an antenna non-object. In the process of forming a Layer M3, a wiring Seg. 3, 1 is an antenna object and a Seg. 3, 2 is an antenna non-object. In the LSI circuit designing system, by using an antenna error judging calculating formula shown in FIG. 14, it is verified that a value on the right side of the equation does not exceed a value on the left side of the equation for every wiring net in each wiring layer (Layer) and a wiring segment causing an antenna error is detected and recognized and an antenna error is corrected. As a reference value on the left side of the equation, when a Diff (Diffusion) pin is connected to an attention-focused wiring segment, a relaxed reference value is used for the verification. In FIG. 14, since the Seg. 3, 1 and Seg. 3, 2 are connected to an output pin (Diffusion pin) of a driver cell, the above relaxed reference value is used for the verification. Conventionally, two methods for correcting an antenna error at a time of layout are available, one being an antenna damage preventing method (1) to be performed by changing wiring topology (wiring layer allocation structure) and an antenna damage preventing method (2) to be performed by connecting a diode.

FIGS. 15A and 15B are diagrams explaining the antenna damage preventing method (1) to be performed by changing the wiring topology. According to the above method (1), as shown in FIG. 15A, a wiring segment which causes an antenna error is first found out (in FIG. 15A, in a state before correction, wiring segment Seg. 2, 1). By employing a placement pattern in which both ends of the wiring segment Seg. 2, 1 causing an error are lifted to an upper layer and a portion except the both ends of the wiring segment Seg. 2, 1 is brought down, and, as shown in FIG. 15B, after the correction, wiring segments Seg. 2, 2, Seg. 3, 1, Seg. 2, 1, Seg. 3, 2 and Seg. 2, 3 are formed. In this case, when the long wiring segment Seg. 2, 1 causing an error was formed, the other segments Seg. 3, 1 and Seg. 3, 2 did not existed. As a result, the Seg. 2, 1 is not connected to the gate pin in a separated manner and, thus, the antenna error is corrected. Owing to this, at the time of plasma etching process, no antenna damage occurs in the gate oxide film of each of the MOS transistors.

FIGS. 16A and 16B are diagrams explaining the antenna damage preventing method (2) to be performed by connecting diodes. According to this method (2), as in the case of the method (1), first, a wiring segment causing an antenna error is found out (before correction, Seg. 2, 1). When its connection state is seen from the Seg. 2, 1, there is no connection of the Seg. 2, 1 to the output pin (Diffusion pin) and, therefore, as a value on the left side of the antenna error judging calculating formula shown in FIG. 14, the reference value not relaxed is used. After the correction, as shown in FIG. 16B, by connecting a diffusion pin being a diode cell to the Seg. 1, 1, as the left side of the judgment calculating formula, a relaxed reference value is used, thus the correction is made.

In addition to the antenna damage preventing methods (1) and (2) described above, another conventional technology of this type is disclosed in Patent Reference 1 (Japanese Patent Application Laid-open No. 2000-114383 [Abstract, FIG. 1]). In the semiconductor integrated circuit interconnection route correcting method disclosed in the Patent Reference 1, one of gates having an amount of estimated damage caused by the erroneous antenna effect which exceeds the maximum permissible amount is selected out and a small area through which the wiring connected to the one of gates and a wiring layer through which the wiring is allowed to pass in the small area are selected and wirings in the small area are peeled off and a correction is made so that the peeled-off wiring passes through the selected wiring layer. If, by this correction, the amount of estimated damage does not become smaller than the maximum permissible amount, the interconnection route is restored to a state existed before the correction of wiring and these processes are repeated until the amount of estimated damage at all gates becomes smaller than the maximum permissible amount.

Still another technology of an automatic wiring-placement apparatus is disclosed in Patent Reference 2 (Japanese Patent Application Laid-open No. 2001-102458 [Page 5, FIG. 2]) in which a wiring in the second layer metal wiring is divided into two wiring portions and a new wiring portion making up the third layer metal wiring is connected between the divided wiring portions.

However, the above antenna damage preventing methods used in the conventional LSI circuit designing system have the following problems. That is, in the antenna damage preventing method (1), as shown in FIGS. 15A and 15B; in a state before correction, the wiring segment Seg. 2, 1 is the segment causing an antenna error and, assuming that the wiring layer M2 serves as the uppermost wiring layer, in a state after correction, the correction and prevention of an antenna damage are impossible by using the further upper wiring layer M3. Therefore, when longer wirings that can be used as signal wirings need to be installed in the uppermost layer, the method (1) cannot be used.

Moreover, in the method (2), as shown in FIG. 17A, in a state before the correction, the wiring segment Seg. 2.1 is the segment causing an antenna error and a diffusion pin is connected to the Seg. 1, 2 of the wiring layer Ml, which brings about a state in which the uppermost layer wiring is connected, all the time, to the diffusion pin of a driver cell and, as a result, a value on the left side of the antenna error judging calculating formula is already a relaxed reference value and, as shown in FIG. 17B illustrating an after-correction state, even if the diffusion pin of the diode cell is further connected to any one of the wiring segments, the correction and prevention are impossible. Thus, by the conventional methods, the problem cannot be solved that wirings on the uppermost layer being able to provide advantages in terms of low-resistance and design for delay are not allowed to be lengthened in an arbitrary manner.

Furthermore, the interconnection route correcting method disclosed in the Patent Reference 1 differs from that of the present invention in that the only purpose of the technology disclosed in the Patent Reference 1 is to change the interconnection route. Also, in the automatic wiring placement apparatus disclosed in the Patent Reference 2, the antenna damage is controlled only by changing interconnection route, which differs from the method of the present invention.

SUMMARY OF THE INVENTION

In view of the above, it is an object of the present invention to provide an LSI circuit designing system which is capable of lengthening the wirings on the uppermost layer being able to provide advantages in terms of design for delay up to a degree to which bluntness of a waveform or output capacity approaches a theoretical limit and of easily preventing antenna damage even when a longer wiring is installed on the uppermost layer by improving the method using the conventional diode connection, the antenna damage preventing method to be employed in the above system and the antenna damage prevention controlling program.

According to a first aspect of the present invention, there is provided an LSI circuit designing system for carrying out layout design by inputting information about configurations of circuits internally formed in each LSI including MIS transistors, including:

a gate size correcting unit to detect a wiring segment expected to cause an antenna damage to a gate insulating film of each of the MIS transistors due to an antenna effect that the wiring segment absorbs electric charges generated during plasma etching processes and to correct, based on a result from specified simulation or from specified experiment, an area of a gate electrode of each of the MIS transistors connected to the detected wiring segment so as to become a value that enables the prevention of the antenna damage.

In the foregoing, a preferable mode is one wherein the gate size correcting unit includes:

a sizing candidate table creating unit to store correction candidate values to be used for correction of an area of the gate electrode in ascending order for every type of a cell corresponding to the circuit configurations to create a sizing candidate cell table;

an antenna error net detecting unit to detect a net having a wiring segment expected to cause the antenna damage;

a gate pin/cell recognizing unit to recognize a gate pin connected to the net and a type of a cell corresponding to the gate pin; and a cell sizing unit to judge whether or not the antenna damage is able to be prevented by using the correction candidate values in ascending order stored in the sizing candidate cell table based on a specified judgment standard and to correct an area of the gate electrode by using a minimum value that enables the prevention of the antenna damage.

Also, a preferable mode is one wherein the LSI includes a plurality of wiring layers and wherein the antenna error net detecting unit is configured to detect a net having a wiring segment expected to cause the antenna damage and wherein the cell sizing unit is configured to judge, for every wiring layer, whether a ratio of a sum total of metal areas to a sum total of an area of the gate electrode contained in a wiring layer is not larger than a predetermined reference value and judges, when the ratio is not larger than the reference value, the antenna damage as being able to be prevented.

According to a second aspect of the present invention, there is provided an LSI circuit designing system for carrying out layout design by inputting information about configurations of circuits internally formed in each LSI including MIS transistors, including:

an antenna error preventing unit to detect a wiring segment expected to cause antenna damage to a gate insulating film of each of the MIS transistors due to an antenna effect in which the wiring segment absorbs electric charges generated during plasma etching processes and to connect, based on a result from a specified simulation or from a specified experiment and via the wiring segment, an antenna error preventing cell to provide a specified gate area and to diffuse electric charges absorbed in the wiring segment to a gate electrode of each of the MIS transistors connected to the detected wiring segment in number that enables the prevention of the antenna damage.

In the foregoing, a preferable mode is one wherein the antenna error preventing unit includes:

an antenna error net detecting unit to detect a net having a wiring segment expected to cause the antenna damage; and an antenna error preventing cell connecting unit to connect the antenna error preventing cell to the detected wiring segment.

Also, a preferable mode is one wherein the LSI includes a plurality of wiring layers and wherein the antenna error net detecting unit is configured to detect, for every wiring layer, a net having a wiring segment expected to cause the antenna damage and wherein the antenna error preventing cell connecting unit is configured to connect, for every wiring layer, the antenna error preventing cell to each of detected wiring segments.

Furthermore, a preferable mode is one wherein the antenna error preventing cell is configured so that its input terminal is connected to a gate circuit having a specified gate area, an anode of a first diode to diffuse electric charges absorbed in the wiring segment, and a cathode of a second diode to diffuse the electric charges.

According to a third aspect of the present invention, there is provided an antenna damage preventing method to be used for an LSI circuit designing system for carrying out layout design by inputting information about configurations of circuits internally formed in each LSI including MIS transistors and for preventing antenna damage occurring in a gate insulating film of each MIS transistor, the method including:

detecting a wiring segment expected to cause an antenna damage to a gate insulating film of each of the MIS transistors due to an antenna effect that the wiring segment absorbs electric charges generated during plasma etching processes; and correcting, based on a result from a specified simulation or from a specified experiment, an area of a gate electrode of each of the MIS transistors connected to the detected wiring segment so as to become a value that enables the prevention of the antenna damage.

In the foregoing, a preferable mode is one that wherein includes:

sizing candidate table creating processing for storing correction candidate values to be used for correction of an area of the gate electrode in ascending order for every type of a cell corresponding to the circuit configurations to create a sizing candidate cell table;

antenna error net detecting processing for detecting a net having a wiring segment expected to cause the antenna damage;

gate pin/cell recognizing processing for recognizing a gate pin connected to the net and a type of a cell corresponding to the gate pin; and cell sizing processing for judging whether or not the antenna damage is able to be prevented by using the correction candidate values stored in the sizing candidate cell table based on a specified judgment standard and for correcting an area of the gate electrode by using a minimum value that enables the prevention of the antenna damage.

Also, a preferable mode is one wherein the LSI includes a plurality of wiring layers and wherein the antenna error net detecting unit is configured to detect a net having a wiring segment expected to cause the antenna damage and wherein the cell sizing unit is configured to judge, for every wiring layer, whether a ratio of a sum total of metal areas to a sum total of an area of the gate electrode contained in a wiring layer is not larger than a predetermined reference value and judges, when the ratio is not larger than the reference value, the antenna damage as being able to be prevented.

According to a fourth aspect of the present invention, there is provided an antenna damage preventing method to be used for an LSI circuit designing system for carrying out layout design by inputting information about configurations of circuits internally formed in each LSI including MIS transistors and for preventing antenna damage occurring in a gate insulating film of each of the MIS transistors, the method including:

detecting a wiring segment expected to cause antenna damage to a gate insulating film of each of the MIS transistors due to an antenna effect in which the wiring segment absorbs electric charges generated during plasma etching processes; and connecting, based on a result from specified simulation or from a specified experiment and via the wiring segment, an antenna error preventing cell to provide a specified gate area and to diffuse electric charges absorbed in the wiring segment to a gate electrode of each of the MIS transistors connected to the detected wiring segment in number that enables the prevention of the antenna damage.

In the foregoing, a preferable mode is one that wherein includes:

antenna error net detecting processing for detecting a net having a wiring segment expected to cause the antenna damage; and antenna error preventing cell connecting processing for connecting the antenna error preventing cell to the detected wiring segment.

Also, a preferable mode is one wherein the LSI includes a plurality of wiring layers and, in the antenna error net detecting processing, a net having a wiring segment expected to cause the antenna damage is detected and, in the antenna error preventing cell connecting processing, the antenna error preventing cell is connected to the detected wiring segment.

According to a fifth aspect of the present invention, there is provided an antenna damage prevention controlling program to be executed by a computer for realizing functions of the LSI circuit designing system described above.

With the above configurations, the wiring segment expected to cause antenna damage to a gate insulating film (for example, the gate oxide film in each of MOS transistors) due to an antenna effect in which the wiring segment absorbs electric charges generated during plasma etching processes is detected by the gate sizing means and an area of the gate electrode of each of the MIS transistors connected to the detected wiring segment is corrected (that is, gate-sized) to become a value enabling the prevention of antenna damage occurring in the gate insulating film of each of the MIS transistors and, therefore, antenna damage can be prevented without shortening a length of the uppermost layer wiring providing advantages in terms of low resistance and design for delay. The above gate-sizing process makes it unnecessary to perform designing of diodes with only the aim of preventing the antenna damage.

With still another configurations above, the antenna preventing cell in number that enables the prevention of the above antenna damage is connected, by the antenna error preventing means, via the wiring segment, to a gate electrode of each of the MIS transistors to be connected to the detected wiring segment and, therefore, a sum total of gate areas can be made large and antenna damage can be prevented without shortening a length of the uppermost layer wiring and a degree of freedom for design for delay and layout of circuits can be increased. Moreover, by the connection of the above antenna error preventing cell to the gate electrode, electric charges absorbed in the wiring segment are diffused and, as a result, an effect of correcting antenna errors can be improved even with the diffusion pin being not connected to the wiring segment in an intermediate layer formed below the uppermost layer.

BRIEF DESCRIPTION OF THE DRAWINGS

The above and other objects, advantages, and features of the present invention will be more apparent from the following description taken in conjunction with the accompanying drawings in which:

FIG. 4 is a diagram showing images of a library and a sizing candidate cell table;

FIG. 5 is a diagram explaining a procedure of creating a sizing candidate table by using a sizing candidate creating means;

FIGS. 6A, 6B and 6C are diagrams explaining a procedure of detecting and correcting an antenna error;

FIGS. 12A, 12B and 12C are diagrams explaining detection of an antenna error and a connection procedure for an antenna error preventing cell according to the second embodiment of the present invention;

FIG. 13 is a diagram explaining an effect by connection of the antenna error preventing cell—according to the second embodiment of the present invention;

FIG. 14 is a diagram explaining an process antenna effect;

FIGS. 16A and 16B are diagrams explaining an antenna damage preventing method (2) to be performed by connecting a diode; and FIGS. 17A and 17B are diagrams explaining an example in which antenna damage cannot be corrected by inserting diodes.

DETAILED DESCRIPTION OF THE PREFERRED EMBODIMENTS

Best modes of carrying out the present invention will be described in further detail using various embodiments with reference to the accompanying drawings. According to the present invention, an LSI circuit designing system is provided which can prevent antenna damage owing to a decrease in voltage applied to a gate oxide film of each of MOS transistors by making large a denominator on the right side of the antenna error judgment calculating formula in FIG. 13 and by making small a reference value on the left side of the formula through connection to a cell so as to up-size a gate pin (receiver cell input pin) connected to the wiring segment causing antenna damage, that is, to up-size a gate area of each of the MOS transistors, an antenna damage preventing method, and prevention controlling program are provided.

Figure 1:
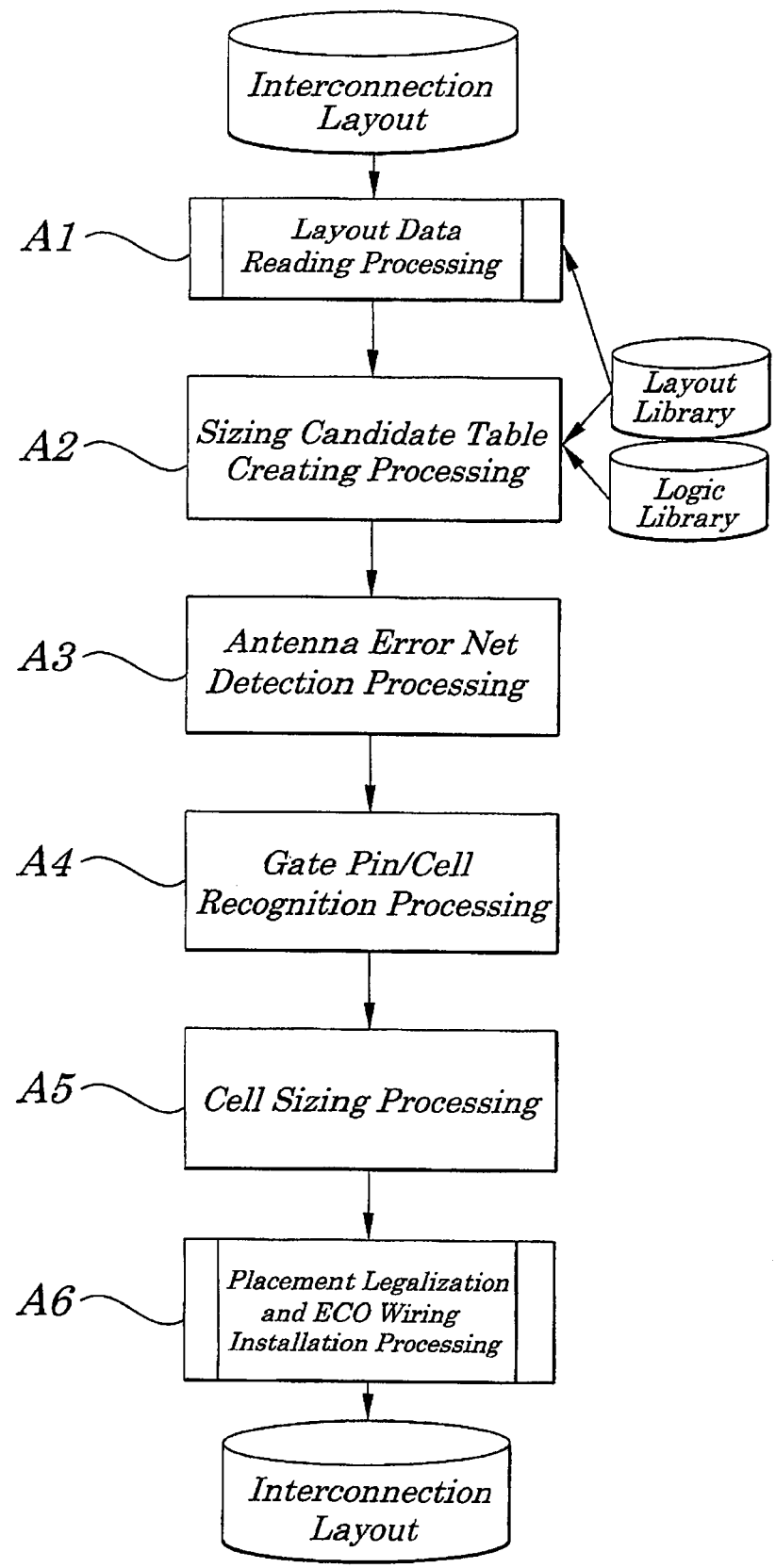
FIG. 1 is a flow chart explaining basic principles of the present invention.

For example, as shown in FIG. 1, by performing layout data reading processing, layout data obtained after the installation of wirings is read (Step A1) and, in sizing candidate table creating processing, an up-sizing candidate table is created (Step A2) in advance using various libraries (layout library, logic library, and a like) so that candidate values are arranged for every functional cell in ascending order of a gate area. These various libraries are prepared in advance based on results from specified simulation or from specified experiments. Then, by performing antenna error detection processing, a net having a wiring segment causing an antenna error is detected for each wiring layer (Step A3).

Figures 2A, 2B:
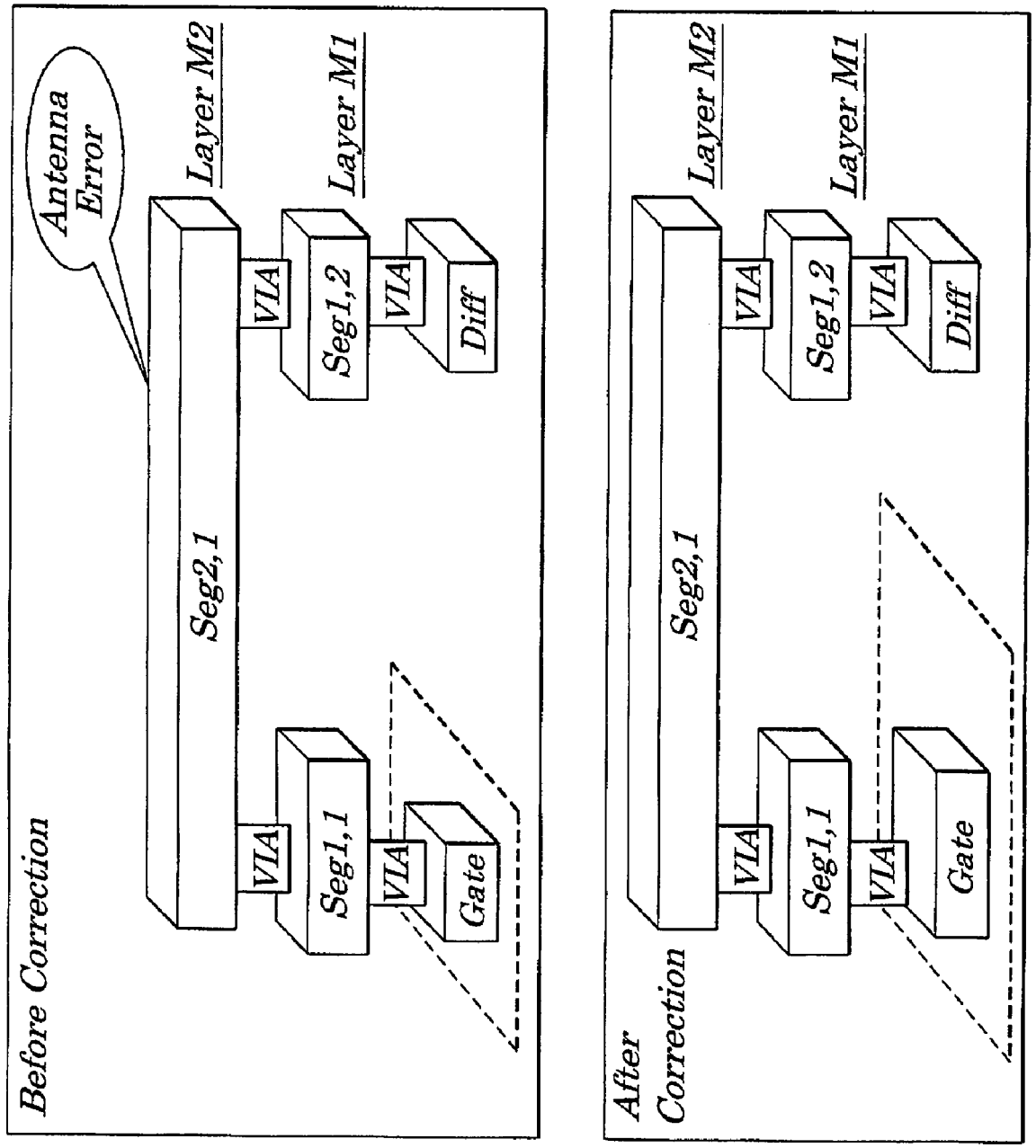
FIGS. 2A and 2B are diagrams illustrating each processing to be performed in FIG. 1.

As shown in FIG. 2A (before the correction), it is now assumed that there is a wiring portion causing an antenna error that cannot be corrected by the conventional methods (1) and (2) (assuming that the wiring layer M2 is the uppermost layer). In gate pin/cell recognition processing, a gate pin to be connected to the net, its instance (each entity in circuits of an entire LSI such as a buffer or logical operation standard cell), and a type of a cell are recognized (Step A4) and then, in cell sizing processing, as shown in FIG. 2B (after the correction), each functional cell is up-sized so as to become a cell in which a result of judgment by using the antenna error judgment calculating formula shown in FIG. 13 does not indicate an error, by referring to an gate area contained in the up-sizing candidate table (Step A5).

Even in the case of multi-fan-out connection, the up-sizing operation is sequentially performed on each cell connected in a fan-out manner by the same way as described above repeatedly until an antenna error does not occur. After the repetition of these processes on each net causing an antenna error, wiring placement legalization processing is performed and ECO (Ecological) wirings are installed (Step A6). Moreover, the placement legalization refers to a processing to remove overlapped placement or a flip placement error of a wiring segment and the ECO wiring refers to a processing to maintain an existing wiring long as much as possible and to install wirings in a portion in which wiring segments are partially broken.

First Embodiment

Figure 3:
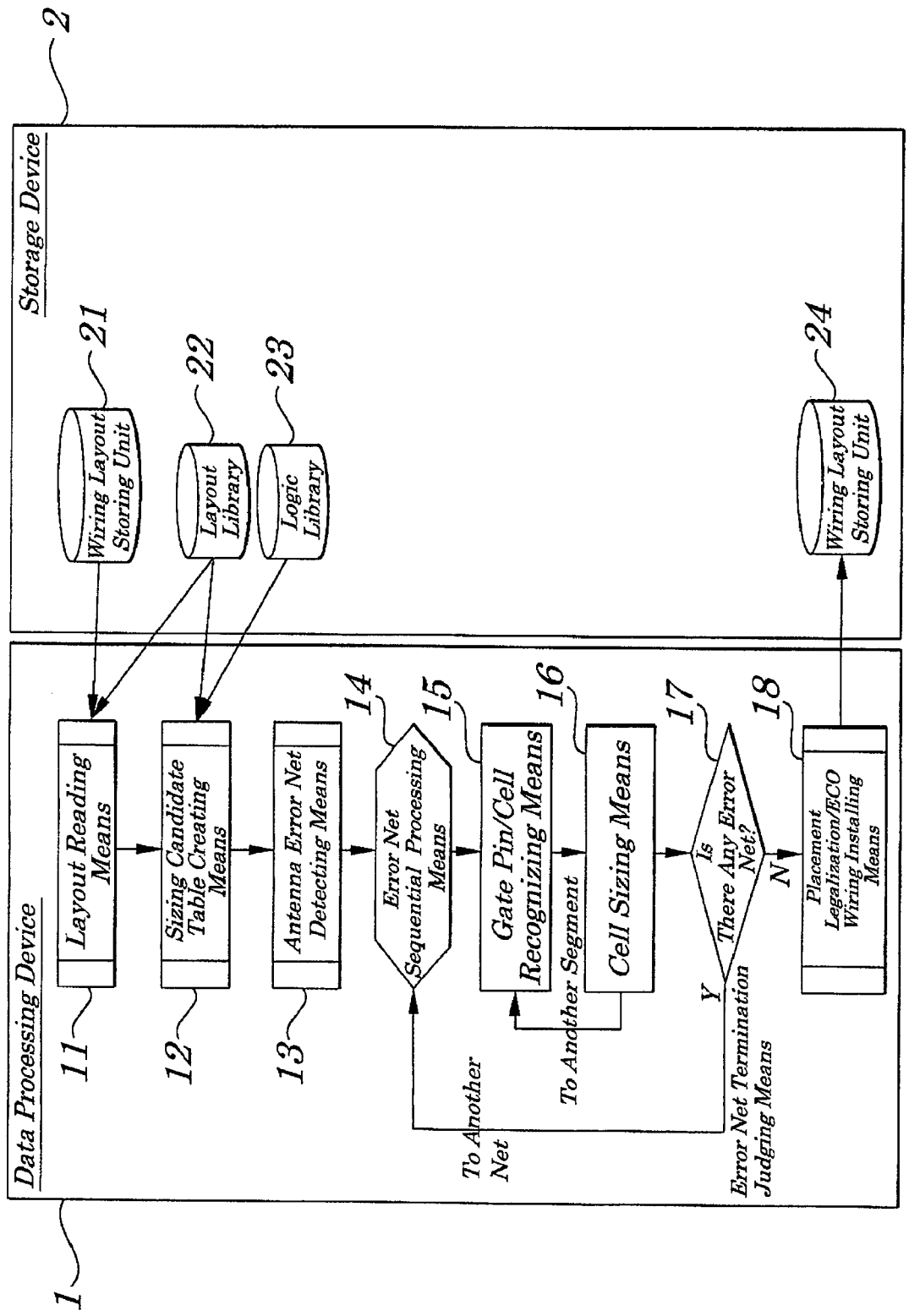
FIG. 3 is a block diagram showing configurations of main components making up the LSI circuit designing system according to a first embodiment of the present invention.

FIG. 3 is a block diagram showing configurations of main components making up an (Large-Scale Integrated) LSI circuit designing system of the first embodiment of the present invention. In FIG. 1, a processing number for the flow chart is assigned to each block as a reference number. The LSI circuit designing system of the first embodiment, as shown in FIG. 3, includes a data processing device 11 and a storage device 2, by inputting circuit information corresponding to circuit configurations in the LSI made up of MOS (Metal Oxide Semiconductor) transistors, layout design corresponding to the circuit configuration is carried out. The storage device 2 is made up of a hard disk to permanently store information or a like and includes a wiring layout storing unit 21, a layout library 22, a logic library 23, and a wiring layout storing unit 24. The wiring layout storing unit 21 stores layout information free from a DRC (Design Rule Checking) error obtained after the completion of design for delay following placement and routing of each element making up circuit configurations in the LSI. The DRC refers to a checking corresponding to an interconnection rule in manufacturing processes. The layout library 22 stores information about, for example, an interconnection rule depending on each manufacturing process, antenna reference value for every wiring layer (that is, a value of a left side of the antenna error judgment calculating formula in FIG. 8), definition of the VIA (via hole), graphic information about cells (including, for example, an input pin and gate area value for antenna calculation, information about diffusion pin identification), or a like. The logic library 23 stores information about the definition of a function of a cell (function corresponding to a logic circuit), capacity of an input pin, table for delay calculation, or a like. The wiring layout storing unit 24 stores information about layout of wirings fed from the data processing device 1.

The data processing device 1 is made up of a computer to be operated by control of the antenna damage prevention controlling program and includes a layout reading means 11, a sizing candidate table creating means 12, an antenna error net detecting means 13, an error net sequential processing means 14, a gate pin/cell recognizing means 15, a cell sizing means 16, an error net termination judging means 17, and a placement legalization/ECO wiring installing means 18. The layout reading means 11 reads information about contents stored in the wiring layout storing means 21 and prepares for subsequent and later layout editing processing. The sizing candidate table creating means 12 creates a sizing candidate table by identifying, using the logic library 23, a plurality of types of cells each having the same function and driving power being different from one another and by referring to corresponding cell information stored in the layout library 22 to read an input pin/gate area value and by storing, for every type of a cell, correction candidate values to be used for correcting an area of a gate electrode in ascending order. The table is configured to contain a cell name, a cell area, and a gate area. Driving power is allowed to be recorded in an arbitrary manner and, if there is a plurality of cells each having the same gate area, only a cell having a minimum area is recorded in the table. Moreover, in the case of a multi-input cell, the sizing candidate cell table is created for every input pin by the same way as above.

FIG. 4 is a diagram showing images of a library and a sizing candidate cell table. In FIG. 4, no units are provided to each gate area stored in the layout library 22 or each area stored in the logic library 23 so that these areas can be distinguished from one another in size and an intuitive format is assigned to each logical function stored in the logic library 23. For example, the buffer logic is shown by expressing a relation between the output pin (OUT) and the input pin (IN) as "OUT=IN" as shown in FIG. 4.

Figure 8:
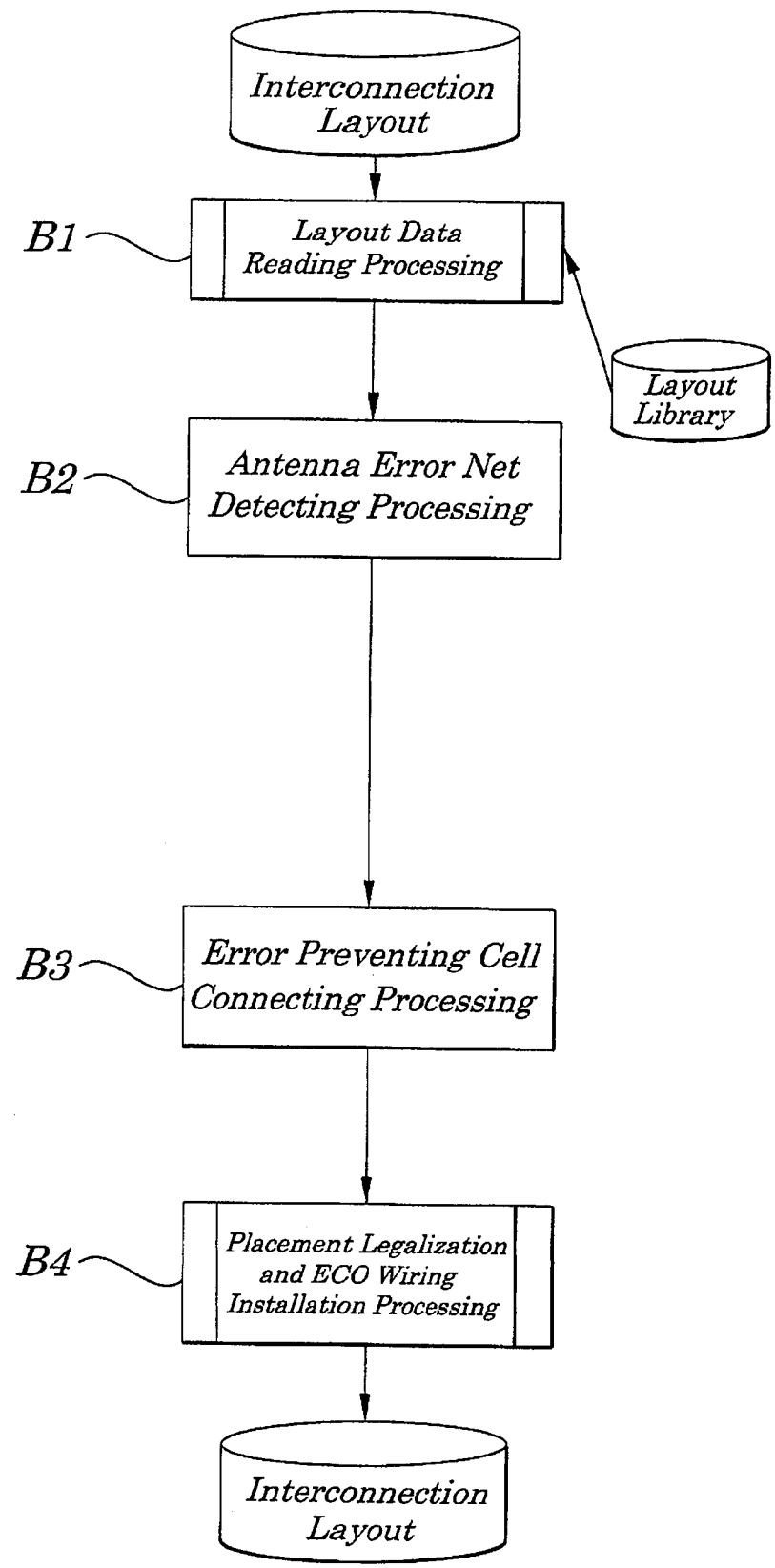
FIG. 8 is a flow chart explaining basic principles employed in another modified embodiment.

The antenna error net detecting means 13 detects a net having a wiring segment causing an antenna error, that is, the net in which an antenna damage expected to occur exists in every wiring layer and, if errors occur in a plurality of wiring layers or a plurality of wiring segments in a multiple manner, stores an error value (a value of the right side—a value of the left side of the antenna error judgment calculating formula shown in FIG. 8), a wiring layer causing the antenna error, a sum total of metal areas of the wiring segment where the error occurs, and an antenna reference value in a segment of each wiring layer. The error net sequential processing means 14 focuses attention to one of the nets detected by the antenna error net detecting means 13 and prepares for subsequent and later processing. The gate pin/cell recognizing means 15 recognizes a gate pin connected to the detected net and, in the first embodiment in particular, a type of the cell corresponding to the detected gate pin and stores an gate input pin connected to a lower layer below the wiring segment in which the antenna error has occurred and information about a type of the cell corresponding to the gate pin and all cells connected in a fan-out manner.

The cell sizing means 16 judges whether or not antenna damage can be prevented based on a specified judgment reference value by using a candidate value for correction stored in the sizing candidate table in ascending order for every-type of the cell recognized by the gate pin/cell recognizing means 15 and corrects an area of a gate electrode by using a minimum value at which the antenna damage can be prevented. In this situation, the cell sizing means 16 judges whether a ratio of the sum total of the metal (for example, copper [Cu]) area to the sum total of the gate area included in the wiring layer is not larger than a reference value for every wiring layer and, when the ratio is not larger than the reference value, judges that it is possible to prevent the antenna damage. In the first embodiment in particular, the cell sizing means 16 calculates a required gate area value based on an area of the error metal detected therein and stored by the antenna error net detecting means 13 and the antenna reference value of the error wiring layer and selects a cell on which an up-sizing process is to be performed by using the above sizing candidate cell table based on the information about the pin and cell recognized by the gate pin/cell recognizing means to perform a gate-sizing process.

Also, in the case of the gate with multi-fan-out for other cells, the cell sizing means 16 up-sizes the other cells sequentially in the same method as described above and the up-sizing processing is repeated until no antenna error occurs and, when errors occur in a multiple manner in a plurality of wiring segments in one net, the same up-sizing processing is repeated in every error wiring segment. Moreover, when all the error wiring segment processing is completed, the routine returns back to the processing by the error net sequential processing means 14 so that attention is focused on another error net and the processing by the gate pin/cell recognizing means 15 to cell sizing means 16 is performed on all the error nets repeatedly.

The error net termination judging means 17 judges whether or not there is an error net. The placement legalization/ECO wiring installing means 18 removes overlapped placement in a region surrounding the up-sized instance and/or flip placement error and installs partially wiring in a portion in which wiring segments are partially broken due to placement movement.

Figure 7:
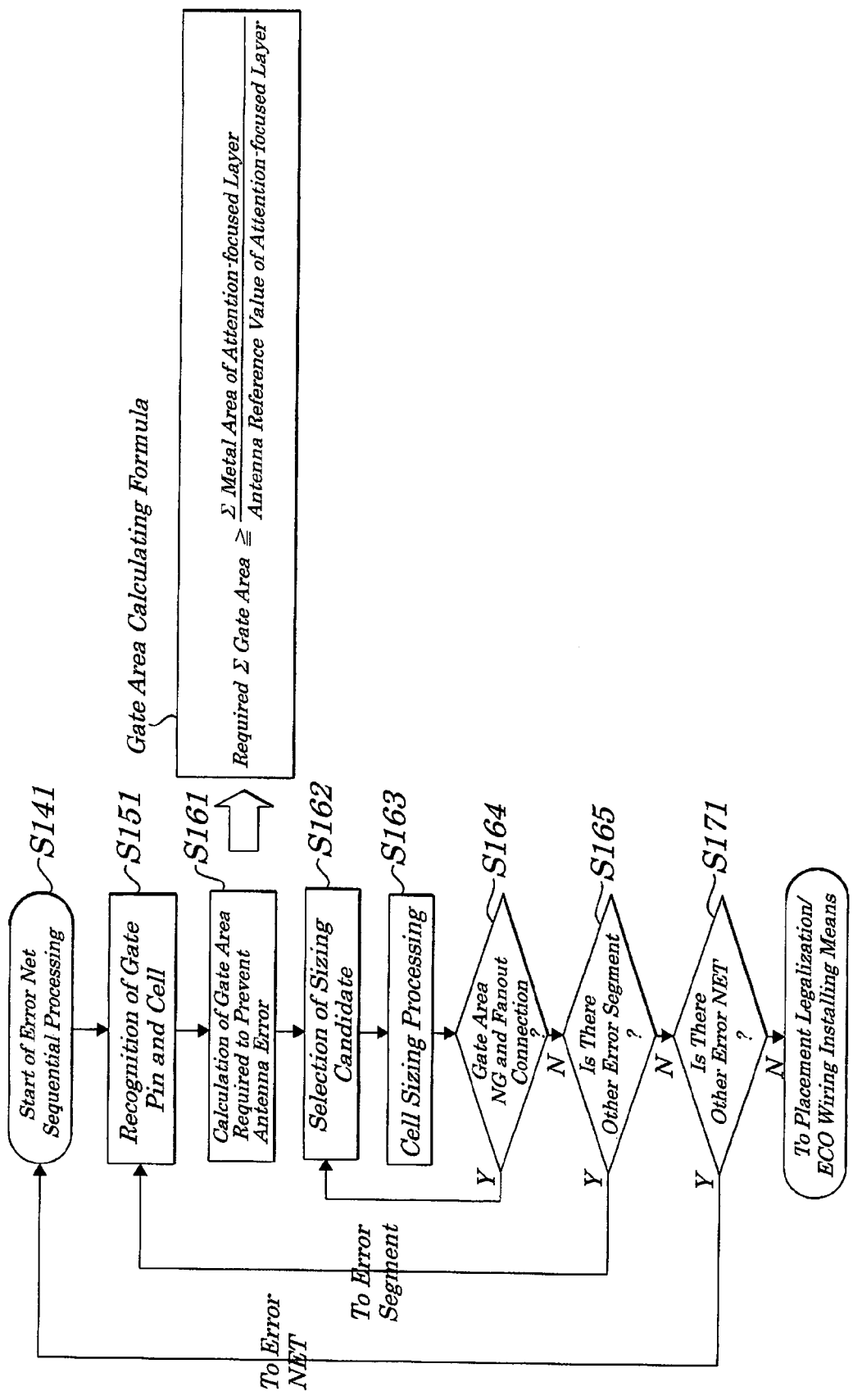
FIG. 7 is a flow chart explaining processing of cell sizing.

FIG. 5 is a diagram explaining a procedure of creating the sizing candidate table by using the sizing candidate creating means 12. FIGS. 6A, 6B and 6C are diagrams explaining a procedure of detecting and correcting an antenna error. FIG. 7 is a flow chart explaining processing of the cell sizing. By referring to these drawings, the method for preventing antenna damage to be employed in the LSI circuit designing system of the first embodiment is described. In the LSI circuit designing system, a wiring segment expected to cause antenna damage to a gate oxide film of each of MOS transistors due to an antenna effect in which the wiring segment absorbs electric charges generated during plasma etching processes is detected and an area of a gate electrode of each of the MOS transistors to be connected to the detected wiring segment is corrected so as to have a value that enables the prevention of the antenna damage occurring in the gate oxide film of each of the MOS transistors.

That is, layout information stored in the wiring layout storing unit 21 in the storage device 2 is read by the layout reading means 11. Next, a cell name and logical function (function corresponding to a type of a logical circuit) are read by the sizing candidate table creating means 12 from the logic library 23 to create an equivalent cell table 31 (Step S121 in FIG. 5). The equivalent table 31 has a structure of associative placement in which logic (including a pointer to a sizing candidate table) using a cell name as a key is stored in the form of data so that the sizing candidate table can be traced quickly during the sizing candidate table creating processing by the sizing candidate table creating means 12 and/or cell sizing processing by the cell sizing means 16. The associative placement structure refers to a hash data structure in which data can be fetched from a key value (cell name) during a specified short time.

Then, a cell name, gate pin name, and gate area are sequentially read by the sizing candidate table creating means 12 from the layout library 22 and examples 1 and 2 of the sizing candidate tables are created (Step S122 in FIG. 5). At a time point immediately after the above Step S121, pointers having the same logic point to an empty sizing candidate table. At this time, if a cell "BUFIW" is provided by sequential-reading of the layout library 22 by the sizing candidate table creating means 12, an empty sizing candidate table is traced further from the point of the equivalent cell table 31 so that a cell name, cell area, and gate area of an input IN pin are added to the sizing candidate table.

Similarly, when cells "BUF2W", "BUF6W", "NAND1W" and "NAND3W" are processed, cell names, cell areas, or the like are added to the sizing candidate table in a manner in which candidate values are arranged for every cell in ascending order of a gate area in the table. Moreover, each of the cells "NAND1W" and "NAND3W" is of a two-input cell type and, therefore, the sizing candidate table is created for every input pin (gate PIN:A and gate PIN:B). When the sizing candidate table creating means 12 completes the reading of contents of the layout library 22, each sizing candidate table is scanned and, if there is a plurality of cells each having the same gate area, cells other than those having the minimum cell area are deleted. In the first embodiment, since the gate area of the cell "BUF1W" is "1" and the gate area of the cell "BUF2W" is also "1" according to the layout library 22 in FIG. 4 and the logical cell area of the cell. "BUF1W" is "3" and the logical cell area of the cell "BUF2W" is "4" according to the logic library 23, the cell "BUF2W" is deleted and the examples 1 and 2 of the sizing candidate tables can be obtained (sizing candidate table creating processing).

Next, a net having a wiring segment expected to cause antenna damage, that is, a net causing an antenna error is detected by the antenna error net detecting means 13 (antenna error net detection processing). As shown in FIGS. 6A, 6B and 6C, in the case where errors occur in a plurality of nets in a multiple manner, an error value (a value of the right side—a value of the left side of the antenna error judgment calculating formula in FIG. 8), a sum total (□metal area) of metal area of the wiring segment and the wiring layer, and antenna reference value of the wiring segment in which the error occurs are stored.

When an antenna error is detected, for example, as shown in FIG. 6(a), in the NET A, an antenna error occurs in the M5 layer and an error value is "1500". In the NET B, an antenna error occurs in the M6 and an error value is "500" and an antenna error occurs in the M7 and an error value is "2000". Moreover, in FIG. 6A, names of an instance, pin, and cell logically connected in a fan-out manner in a net list are shown and each arrow represents a relation of a physical wiring connection of wiring segments in which an error occurs.

Next, as shown in FIG. 7, error net sequential processing is performed by the error net sequential processing on a NET A in the example of a detected antenna error shown in FIG. 6A (Step S141). The gate pin/cell recognizing processing is performed by the gate pin/cell recognizing means 15 on a wiring segment in which the first error has occurred (Step S151) and wirings are traced from the wiring segment in the M5 layer toward lower layers and the instance "insA", input gate pin "IN", and cell "BUF1W" connected in a fan-out manner are recognized (gate pin/cell recognizing processing). Then, the sum total of the gate area required to prevent an antenna error is calculated by the cell sizing means 16 (Step S161). In this case, the calculating formula for a gate area shown in FIG. 7 is obtained by changing the antenna error judgment calculating formula shown in FIG. 8. A result from the calculation of the error segment by using this formula for the gate area indicates that the required gate area is "2" (6000/3000).

Next, the cell sizing candidate table is referred to by the cell sizing means 16 using the cell "BUF1W" as a key and the sizing candidate table example 1 shown in FIG. 5 which has been already created is traced from a row of the cell "BUF1W" in the equivalent cell table 31 and the cell "BUF6W" whose gate area is larger than the cell "BUF1W" (gate area: 2) is selected (Step S162). Then, the cell sizing means 16 performs a gate sizing process (cell sizing process) to change the instance "insA" to become the cell "BUF6W" (Cell sizing processing, Step S163).

Next, the sum total of the gate area after the sizing process is re-calculated by the cell sizing means 16 and "2" is obtained and, since the obtained value "2" is more than "2" being a required gate area calculated at Step S161, the routine proceeds to Step S165. In Step S165, whether or not other error wiring segment exists is judged by the cell sizing means 16 and, since there is no error segment in the net A, the routine proceeds to Step S171. In Step S171, attention is focused to a next error NET B and the routine returns to the Step S141 and the same processing is repeated.

In the NET B shown in FIG. 6A, the gate pin/cell recognizing processing is performed on an error in the M6 layer by the gate pin/cell recognizing means 15 (Step S151) and an instance "insB", input gate pin "B", and cell "NAND1W" are recognized and the sum total of gate areas required for preventing an antenna error is calculated by the cell sizing means 16 to be "2.5" (5000/2000) (Step S161). Next, a table of the gate PIN:B of the sizing candidate table example 2 is traced from a cell "NAND1W" and a cell "NAND3W" is selected by the cell sizing means 16 (Step S162) and gate (cell) sizing processing is performed (Step S163) and the sum total of the gate area is re-calculated (Step S164) and "3" is produced by combination of "2" of the cell "NAND3W" with "1" of the cell "BUF1W" which satisfies the required area "2.5" and, therefore, the routine proceeds to Step S165. A mid-point progress which reflects the correction made above is shown in FIG. 6B being a table for "state after connection up to M6 error in NET B".

In the case of the NET B, another error exists in the M7 layer and, therefore, attention is focused on the other error and the routine returns back to the Step S151. In the Step S151, the instance "insB", input gate pin "B", cell "NAND3W" (upsizing process was performed in the previous step), instance "insC", input gate pin "IN", and cell "BUF1W" are recognized by the gate pin cell recognizing means 15. In the Step S161, a sum total of gate areas is calculated by the cell sizing means 16 to be "4" (8000/2000) and, at the first loop in the Step S162, a table of the gate PIN:B of the sizing candidate table Example 2 is traced from the cell "NAND3W" and the cell "NAND3W" is selected. In this situation, since the cell is the same, in the Step S163, the gate sizing processing is skipped (omitted) and, in the Step S164, a sum total of the gate area is re-calculated and, as a result, "3" is produced by combination of "2" of the cell "NAND3W" with "1" of the cell "BUF1W" which does not satisfy "4" calculated in the Step S161 and, therefore, attention is focused on the "insC" being a candidate for subsequent fan-out connection and the routine returns to the Step S162.

In the similar way as above, the instance "insC" is sized to become a cell "BUF6W" (Step S162, S163) and, in the Step S164, the sum total of the gate area is re-calculated to be "4" (8000/2000) and the processing for the NETB is now completed (Step S165, S171). The final processing results are shown in FIG. 6C being a table for "state after correction of all the errors in NET B". Finally, the up-sized instances "insA", "insB", and "insC" and overlapped placement in portions surrounding the instances and/or a flip placement error of wiring segments are removed and wirings in portions in which wiring segments partially broken due to placement movement are partially installed and wiring layout information is output to the wiring layout storing unit 24.

Thus, according to the first embodiment, a wiring segment expected to cause antenna damage to a gate oxide film of each of MOS transistors due to an antenna effect in which the wiring segment absorbs electric charges generated during plasma etching processes is detected and an area of a gate electrode of each of the MOS transistors to be connected to the detected wiring segment is corrected (that is, gate-sized) so as to have a value that enables the prevention of the antenna damage occurring in the gate oxide film of each of the MOS transistors and, therefore, the antenna damage can be prevented without shortening a length of the wiring on the uppermost layer being able to provide advantages in terms of low-resistance and design for delay in the LSI circuit designing processes. Moreover, the above gate-sizing process makes it unnecessary to additionally do designing of diode cells used only to avoid the antenna damage, which serves to simplify the processes.

Figures 9A, 9B:
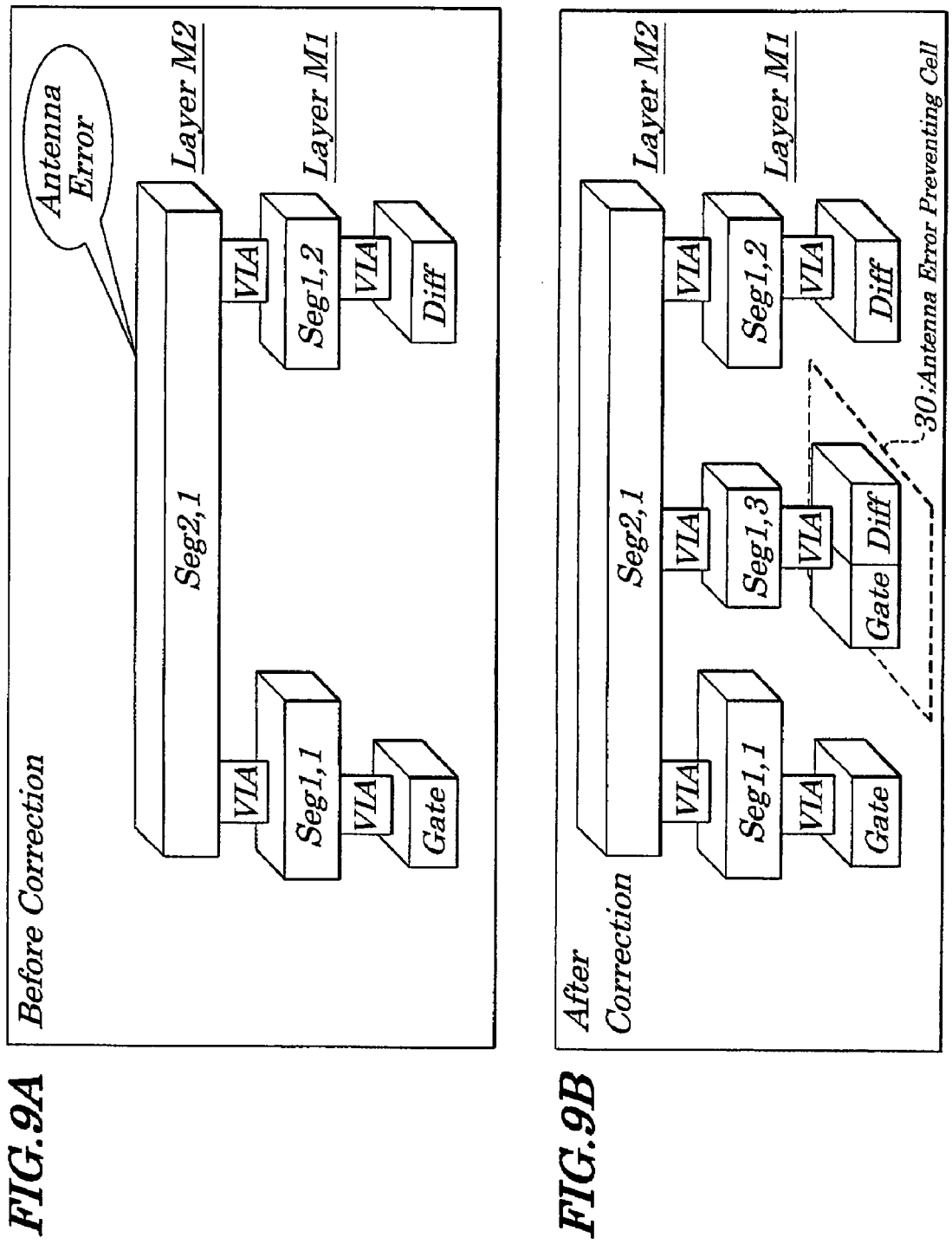
FIGS. 9A and 9B are diagrams explaining each processing performed in the modified embodiment of FIG. 8.

Next, another modified embodiment in which the conventional method using the connection of diodes has been improved is described. In the method, as shown, for example, in FIG. 8, in layout reading processing, layout data obtained after wiring is read (Step B1) and a net causing an antenna error in each wiring layer is detected in the antenna error net detecting processing (Step B2). Here, as shown in FIG. 9A (in the state before correction), in the case where there are antenna errors caused by wiring segments that can be corrected neither by the conventional preventing methods (1) (being assumed that the wiring layer M2 is the uppermost layer) and nor by the method (2), as shown in FIG. 9B (in the state after correction), an antenna error preventing cell 30 is connected to the wiring segment (Seg. 2, 1 in the example) causing an antenna error. The antenna error preventing cell 30 serves to add a specified area to the wiring segment (Seg. 2, 1) and diffuses charges absorbed by the wiring segment (Seg. 2, 1) (Step B3). The processing as above is performed repeatedly on such nets causing antenna errors and finally placement legalizing and ECO wiring installing processing are performed. By connecting the antenna error preventing cell 30 to the wiring segment (Seg. 2, 1), the value of the denominator on the right side of the antenna error judgment calculating formula in FIG. 14 is made larger so that the above value is made smaller than the reference value on the left side of the formula, which enables the prevention of the antenna error. Moreover, in the case where the wiring segment (Seg. 2, 1) exists in an intermediate layer and the diffusion pin is not connected thereto, owing to a diode effect of the connected antenna error preventing cell 30, the value on the left side of the antenna error judgment formula in FIG. 14 is greatly relaxed.

Second Embodiment

Figure 10:
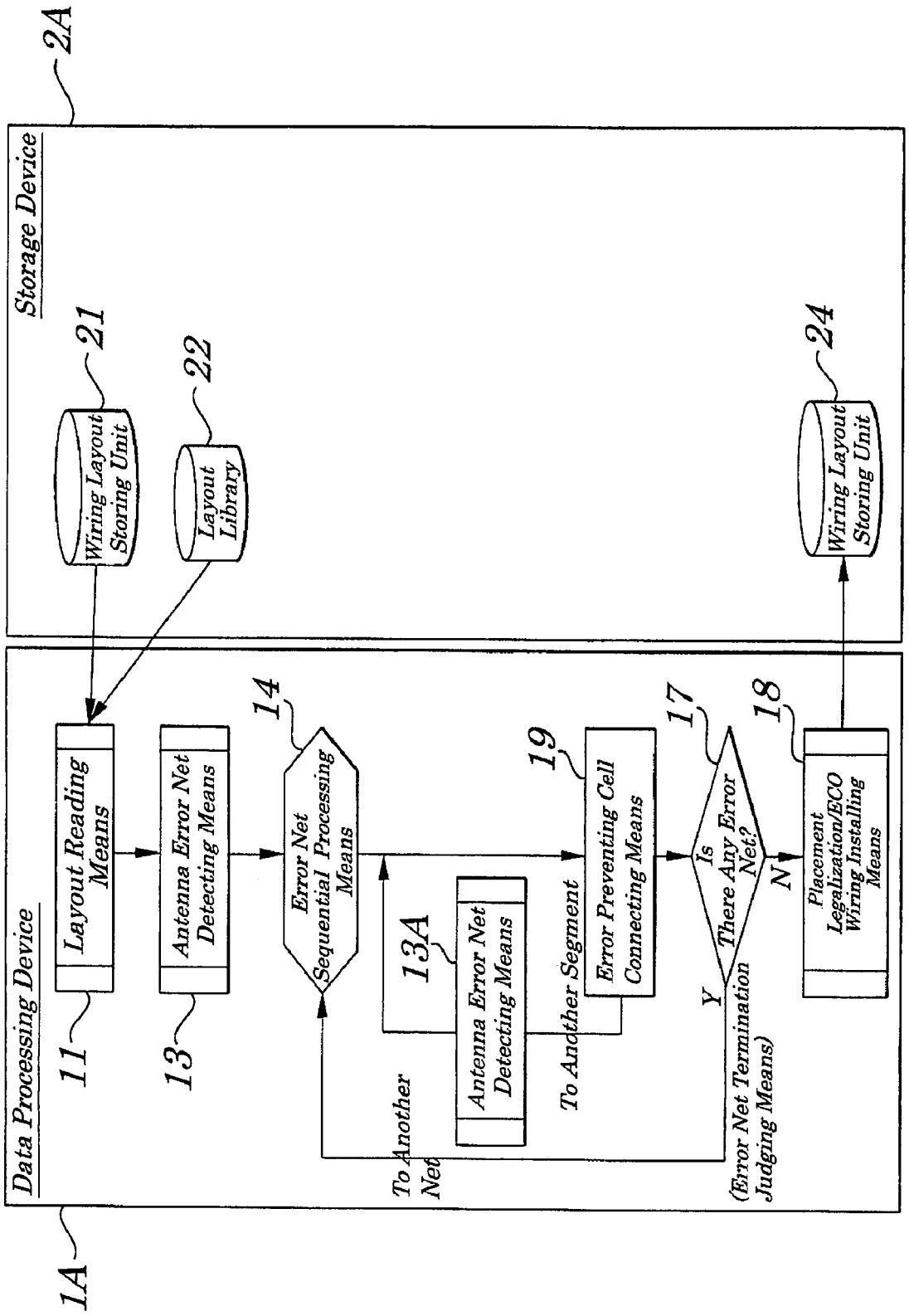
FIG. 10 is a block diagram showing configurations of main components making up the LSI circuit designing system according to a second embodiment of the present invention.

FIG. 10 is a block diagram showing configurations of main components making up the LSI circuit designing system according to the second embodiment of the present invention. In FIG. 10, same reference numbers are assigned to components having the same function as in the first embodiment and their descriptions are omitted accordingly. The LSI circuit designing system of the second embodiment, as shown in FIG. 10, includes, instead of the data processing device 1 and storage device 2 shown in FIG. 3, a data processing device 1A having configurations being different from those in the first embodiment and a storage device 2A. The data processing device 1A has a layout reading means 11, an antenna error net detecting means 13, an error net sequential processing means 14, an error preventing cell connecting means 19, an antenna error net detecting means 13A, an error net termination judging means 17, and a placement legalization/ECO wiring installing means 18. The sizing candidate table creating means 12, gate pin/cell recognizing means 15, and cell sizing means 16 shown in FIG. 3 are removed.

The error preventing cell connecting means 19 connects a gate circuit having a specified area, via the wiring segment, to a gate electrode of each of the MIS transistors connected to the wiring segment detected by the antenna error net detecting means 13 and the antenna error preventing cell 30 in the numbers required for preventing the antenna damage to diffuse charges absorbed into the wiring segment, based on a specified simulation result or specified experimental result, to the wiring segment. The antenna error net detecting means 13A has a function being similar to that of the antenna error net detecting means 13 and detects a net being different from the net in which the wiring segment processed by the error preventing cell connecting means 19 exists. The storage device 2A includes a wiring layout storing unit 21, a layout library 22, and a wiring layout storing unit 24 and the logic library 23 shown in FIG. 3 are removed.

Figures 11A, 11B:
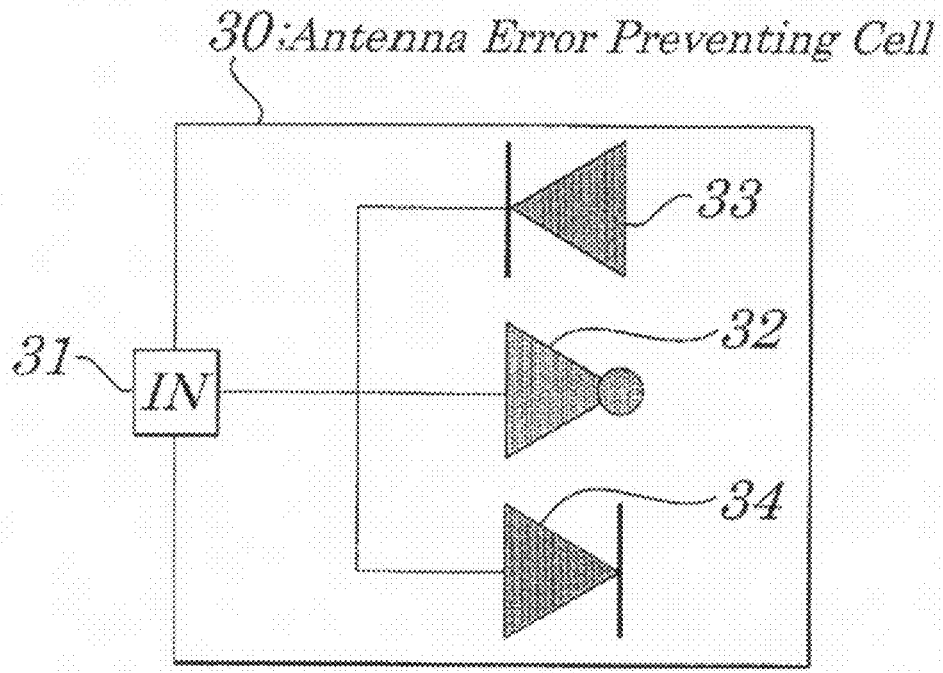
FIGS. 11A and 11B are diagrams showing configurations of an antenna error preventing cell connected by an error preventing cell connecting means according to the second embodiment of the present invention.
Figure 15A:
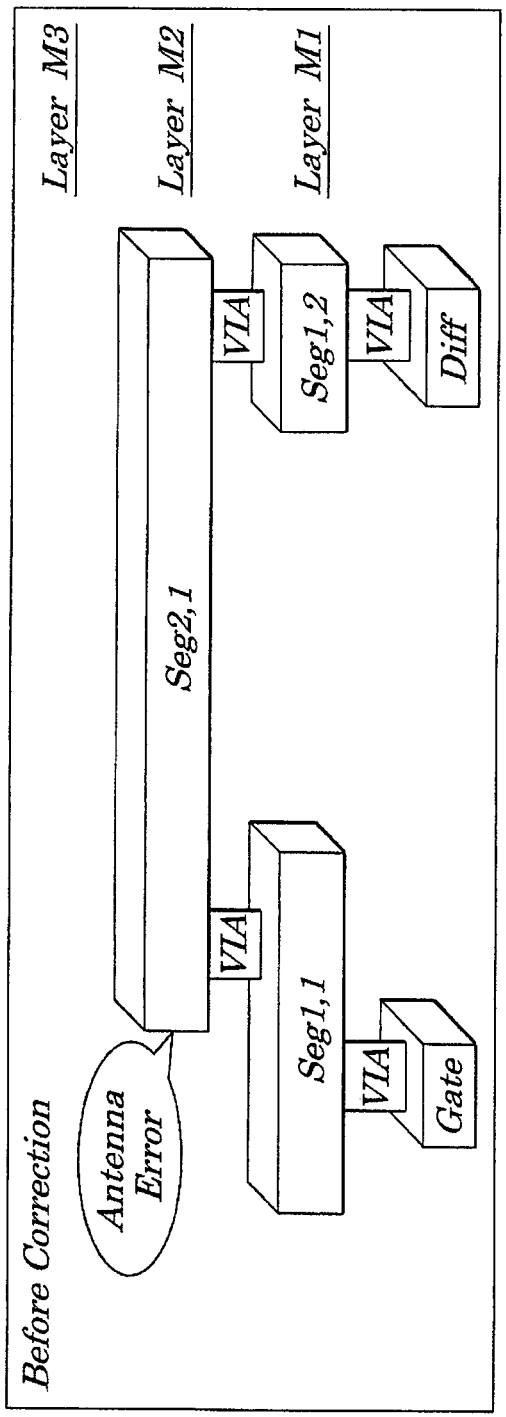
FIGS. 15A and 15B are diagrams explaining an antenna damage preventing method (1) to be performed by changing wiring topology.
Figure 15B:
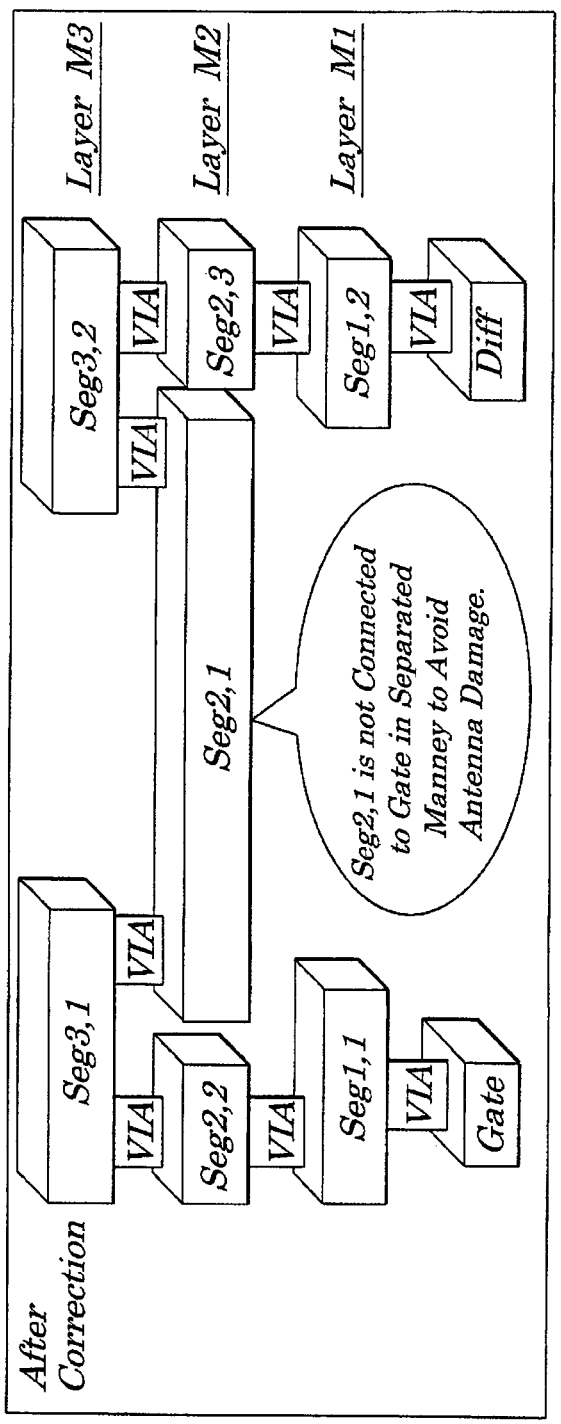

FIG. 11 is a diagram showing configurations of the antenna error preventing cell connected by the error preventing cell connecting means 19 of the second embodiment of the present invention. In the antenna error preventing cell 30, as shown in FIG. 11A, to an input pin (IN) are connected an input pin (IN) 31, an input terminal (gate) of an inverter 32, a cathode of a diode 33, and an anode of a diode 34. Also, as shown in FIG. 11B, the layout library 35 of the antenna error preventing cell 30 stores information about the preventing cell "MACRO", "IN" corresponding to the input pin "PIN", "Gate area 1" corresponding to the gate of the inverter 32, and "with diffusion pin connected" corresponding to the connected diodes.

FIG. 12 is a diagram explaining detection of an antenna error and a connection procedure for an antenna error preventing cell 30 of the second embodiment. FIG. 13 is a diagram explaining an effect by connection of the antenna error preventing cell 30 of the second embodiment. Processing of preventing antenna damage employed in the LSI circuit designing system is described by referring to FIGS. 12A, 12B, 12C and 13. In FIGS. 12A, 12B, and 12C, in order to show correction effects obtained by connecting the antenna error preventing cell 30 embedding a diode, "Fan-in" (for connection of Diffusion pin) column as an object to which a wiring segment causing an antenna error is connected (arrow) is added. In the LSI circuit designing system, as shown in FIG. 12A, an error preventing cell connecting processing is performed on a wiring segment in which an antenna error occurs in the M5 layer in the net (NET) A by the error preventing cell connecting means 19. Since there is a connection of the wiring segments causing an error to "Fanin" from the M5 layer, the antenna reference value is as comparatively severe as, for example, "1500" and "Error" is, for example, "3000". Here, as shown in FIG. 12B, the connection of the antenna error preventing cell A1 (antenna error preventing cell 30) to the wiring segment causing an antenna error in the M5 layer results in the connection of a diode and, therefore, the antenna reference value is relaxed to become "3000" and the gate connection is increased by "1" and an AR (Antenna Ratio) represented by a sum total of metal areas divided by a sum total of gate areas is "2250" (=4500/2), thus the antenna error is corrected (OK).

Next, as shown in FIG. 12C, when an error preventing cell connecting processing is performed on a wiring segment in which an antenna error occurs in the M6 layer in the net (NET) B by the error preventing cell connecting means 19, the preventing cell B1 (antenna error preventing cell 30) is connected to the wiring segment causing errors in the M6 layer and the AR is about "1666" (=5000/3) and the antenna reference value becomes "2000" and, as a result, the antenna error is corrected (OK). Here, "Fanout" connection information fed from remaining wiring segments causing antenna errors is updated. It is now recognized that the preventing cell B1 is also connected to the wiring segment causing errors in the M7 layer through the M5 layer. After that, a sum total of the gate areas only in the NET B is re-calculated by using the antenna error net detecting means 13A. As a result, in the M7 layer, the AR becomes about 2666 (8000/3) and the Error becomes "666" (2666-2000). Finally, when an error preventing cell connecting processing is performed on the wiring segment in which the second error in the NET B occurs by the error preventing cell connecting means 19, the preventing cell B2 (antenna error preventing cell 30) is connected to the wiring segment and the AR becomes "2000" (8000/4) and the antenna reference is "2000", thus errors in all nets being corrected (OK). After corrections of errors in all nets, as in the case of the first embodiment, by the placement legalization/ECO wiring installing means 18, overlapped placement and/or flip placement error in the connected antenna error preventing cell 30 and in portions surrounding the preventing cell 30 are removed and wirings in a portion in which wiring segments partially broken due to placement movement are partially installed and wiring layout information is output to the wiring layout storing unit 24 Thus, according to the second embodiment, a wiring segment causing an antenna error is detected by the antenna error net detecting means 13 and the antenna error preventing cell 30 in number that enables the prevention of antenna damage is connected via the wiring segment to a gate electrode of each of the transistors connected to the wiring segment and a gate circuit having a specified area is connected to the wiring segment and, therefore, the sum total of gate areas is made larger, which enables the prevention of antenna damage without shortening a length of the upper most layer wiring and can provide further advantages of increasing a degree of freedom for design for delay and layout. Moreover, unlike in the first embodiment in which, if a gate of a cell connected to a wiring segment in a fanout manner is up-sized up to its maximum, any more prevention of the antenna error is impossible, according to the second embodiment, the prevention of antenna damage is possible.

Also, according to the second embodiment, electric charges absorbed in the wiring segment detected by the antenna net detecting means 13 are diffused by the antenna error preventing cell 30 and, therefore, both the advantage of achieving large relaxation of the antenna reference value by connecting the diode to the wiring segment and the advantage of obtaining a small AR by increasing a sum total of the gate areas can be obtained at the same time and results from the correction of antenna errors by connecting the diode can be improved even in the case of no connection of the diffusion pin to the wiring segment formed in an intermediate layer below the uppermost layer. When the gate area of the antenna error preventing cell 30 is designed based on a standard size, the antenna reference value is relaxed, for example, as shown in FIG. 13.

That is, assuming that the antenna reference value (value on the left side of the antenna error judgment calculating formula shown in FIG. 14) of a wring layer with a diffusion pin being not connected is C, the reference value is relaxed to be two-fold (2×C) with the diffusion pin being connected. Moreover, there is only a very small increase in number of ECO wirings after connection of the antenna error preventing cell 30 and, therefore, in the state where no diffusion pin is connected in the intermediate layer and an antenna error occurs, and assuming that a numerator on the right side of the antenna error judgment calculating formula remains unchanged, an expression "C>SMA/SGA holds, where SMA denotes the numerator on the right side (□metal area) and SGA denotes the denominator on the right side (□gate area). Here, if one antenna error preventing cell 30 is additionally connected, the expression becomes "2×C>SMA/2×SGA", that is, "4×C>SMA/SGA", which means that the antenna reference value is four-fold relaxed. Additionally, if two antenna error preventing cells 30 are connected, the expression becomes "2×C>SMA/3×SGA", that is, "6×C>SMA/SGA", which means that the antenna reference value is six-fold relaxed. Also, if two antenna error preventing cells 30 are connected, in the uppermost layer, the antenna reference value is 2×C and, therefore, its effect is two-fold and three-fold which is one-half in the case of the intermediate layer. Owing to the relaxation of the antenna reference value, a degree of layout in terms of a length of a wiring, wiring pattern, number of receiver cells or a like is increased. Moreover, in the first embodiment, no diffusion pin is connected and, as a result, the antenna reference value is not relaxed.

It is apparent that the present invention is not limited to the above embodiments but may be changed and modified without departing from the scope and spirit of the invention. For example, each wiring segment (Seg) in FIGS. 2(a) and 2(b) is not limited to configurations in FIGS. 2(a) and 2(b). Also, the numeric values such as those of a gate area shown in above drawings are only examples and the present invention is not limited to these. Also, in the above embodiments, examples of layout design for LSIs made up of the MOS transistors are described, however, the present invention can be applied not only to the MOS transistors but also generally to MIS transistors including an NNOS (Metal Nitride Oxide Silicon) transistor or a like. Furthermore, in the above embodiments, examples of using the gate oxide film as the gate insulating film are described, however, the present invention can be applied to a gate nitride film.

Additionally, the present invention can be applied generally to the LSI circuit designing system to perform layout design of circuit configurations by inputting circuit information corresponding to internal circuit configurations of an LSI made up of MIS transistors such as MOS transistors or a like. In particular, the present invention is effective when an antenna error is to be prevented without shortening a length of the uppermost layer wiring in an LSI.

What is claimed is:

1. A large-scale integrated circuit designing system for carrying out layout design by inputting information about configurations of circuits internally formed in each large-scale integrated circuit comprising metal insulator semiconductor transistors, comprising:

a gate size correcting unit to detect a wiring segment expected to cause a damage to a gate insulating film of each of said metal insulator semiconductor transistors due to an antenna effect that said wiring segment absorbs electric charges generated during plasma etching processes and to correct, based on a result from specified simulation or from specified experiment, an area of a gate electrode of each of said metal insulator semiconductor transistors connected to the detected wiring segment so as to become a value that enables the prevention of said damage, said gate size correcting unit comprising:

a sizing candidate table creating unit to store correction candidate values to be used for correction of an area of said gate electrode in ascending order for every type of a cell corresponding to said circuit configurations to create a sizing candidate cell table;

an antenna error net detecting unit to detect a net having said wiring segment expected to cause said damage;

a gate pin/cell recognizing unit to recognize a gate pin connected to said net and a type of a cell corresponding to said gate pin; and a cell sizing unit to judge whether or not said damage is able to be prevented by using said correction candidate values in ascending order stored in said sizing candidate cell table based on a specified judgment standard and to correct an area of said gate electrode by using a minimum value that enables the prevention of said damage.

2. The large-scale integrated circuit designing system according to claim 1, wherein said large-scale integrated circuit comprises a plurality of wiring layers and wherein said antenna error net detecting unit is configured to detect a net having a wiring segment expected to cause said antenna damage and wherein said cell sizing unit is configured to judge, for every wiring layer, whether a ratio of a sum total of metal areas to a sum total of an area of said gate electrode contained in a wiring layer is not larger than a predetermined reference value and judges, when said ratio is not larger than said reference value, said antenna damage as being able to be prevented.

3. A large-scale integrated circuit designing system for carrying out layout design by inputting information about configurations of circuits internally formed in each large-scale integrated circuit comprising metal insulator semiconductor transistors, comprising:

an antenna error preventing unit to detect a wiring segment expected to cause a damage to a gate insulating film of each of said metal insulator semiconductor transistors due to an antenna effect in which said wiring segment absorbs electric charges generated during plasma etching processes and to connect, based on a result from a specified simulation or from a specified experiment and via said wiring segment, an antenna error preventing cell to provide a specified gate area and to diffuse electric charges absorbed in said wiring segment to a gate electrode of each of said metal insulator semiconductor transistors connected to the detected wiring segment in number that enables the prevention of the damage; and said antenna error preventing unit comprising:

a sizing candidate table creating unit to store correction candidate values to be used for correction of an area of said gate electrode in ascending order for every type of a cell corresponding to said circuit configurations to create a sizing candidate cell table;

an antenna error net detecting unit to detect a net having said wiring segment expected to cause said antenna damage;

a gate pin/cell recognizing unit to recognize a gate pin connected to said net and a type of a cell corresponding to said gate pin; and a cell sizing unit to judge whether or not said antenna damage is able to be prevented by using said correction candidate values in ascending order stored in said sizing candidate cell table based on a specified judgment standard and to correct an area of said gate electrode by using a minimum value that enables the prevention of said antenna damage.

4. The large-scale integrated system according to claim 3, wherein said antenna error preventing unit comprises:

an antenna error preventing cell connecting unit to connect said antenna error preventing cell to the detected wiring segment.

5. The large-scale integrated circuit designing system according to claim 4, wherein said large-scale integrated circuit comprises a plurality of wiring layers and wherein said antenna error net detecting unit is configured to detect, for every said wiring layer, said net having said wiring segment expected to cause said damage and wherein said antenna error preventing cell connecting unit is configured to connect, for every said wiring layer, said antenna error preventing cell to each of detected said wiring segments.

6. The large-scale integrated circuit designing system according to claim 3, wherein said antenna error preventing cell is configured so that an input terminal is connected to a gate circuit having a specified gate area, an anode of a first diode to diffuse electric charges absorbed in said wiring segment, and a cathode of a second diode to diffuse the electric charges.

7. An antenna damage preventing method to be used for an large-scale integrated circuit designing system for carrying out layout design by inputting information about configurations of circuits internally formed in each large-scale integrated circuit comprising metal insulator semiconductor transistors and for preventing damage occurring in a gate insulating film of each metal insulator semiconductor transistor, said method being operated in a computer system, comprising:

detecting a wiring segment expected to cause a damage to a gate insulating film of each of said metal insulator semiconductor transistors due to an antenna effect that said wiring segment absorbs electric charges generated during plasma etching processes;

correcting, based on a result from a specified simulation or from a specified experiment, an area of a gate electrode of each of said metal insulator semiconductor transistors connected to the detected wiring segment so as to become a value that enables the prevention of said antenna damage;

sizing candidate table creating processing for storing correction candidate values to be used for correction of an area of said gate electrode in ascending order for every type of a cell corresponding to said circuit configurations to create a sizing candidate cell table;

antenna error net detecting processing for detecting a net having a wiring segment expected to cause said damage;

gate pin/cell recognizing processing for recognizing a gate pin connected to said net and a type of a cell corresponding to said gate pin; and cell sizing processing for judging whether or not said damage is able to be prevented by using said correction candidate values stored in said sizing candidate cell table based on a specified judgment standard and for correcting an area of said gate electrode by using a minimum value that enables the prevention of said damage.

8. The antenna damage preventing method according to claim 7, wherein said large-scale integrated circuit comprises a plurality of wiring layers and wherein said antenna error net detecting unit is configured to detect a net having a wiring segment expected to cause said damage and wherein said cell sizing unit is configured to judge, for every wiring layer, whether a ratio of a sum total of metal areas to a sum total of an area of said gate electrode contained in a wiring layer is not larger than a predetermined reference value and judges, when said ratio is not larger than said reference value, said damage as being able to be prevented.

9. An antenna damage preventing method to be used for an large-scale integrated circuit designing system for carrying out layout design by inputting information about configurations of circuits internally formed in each large-scale integrated circuit comprising metal insulator semiconductor transistors and for preventing antenna damage occurring in a gate insulating film of each of said metal insulator semiconductor transistors, said method being operated in a computer system, comprising:

detecting a wiring segment expected to cause antenna damage to a gate insulating film of each of said metal insulator semiconductor transistors due to an antenna effect in which said wiring segment absorbs electric charges generated during plasma etching processes;

connecting, based on a result from specified simulation or from a specified experiment and via said wiring segment, an antenna error preventing cell to provide a specified gate area and to diffuse electric charges absorbed in said wiring segment to a gate electrode of each of said metal insulator semiconductor transistors connected to the detected wiring segment in number that enables the prevention of the antenna damage;

sizing candidate table creating processing with a sizing candidate table for storing correction candidate values to be used for correction of an area of said gate electrode in ascending order for every type of a cell corresponding to said circuit configurations to create a sizing candidate cell table;

antenna error net detecting processing with an antenna net detecting unit for detecting a net having a wiring segment expected to cause said damage;

gate pin/cell recognizing processing with a gate pin/cell recognizing unit for recognizing a gate pin connected to said net and a type of a cell corresponding to said gate pin; and cell sizing processing with a cell sizing unit for judging whether or not said damage is able to be prevented by using said correction candidate values stored in said sizing candidate cell table based on a specified judgment standard and for correcting an area of said gate electrode by using a minimum value that enables the prevention of said damage.

10. The antenna damage preventing method according to claim 9, further comprising:

antenna error preventing cell connecting processing for connecting said antenna error preventing cell to the detected wiring segment.

11. The antenna damage preventing method according to claim 10, wherein said large-scale integrated circuit comprises a plurality of wiring layers and, in said antenna error net detecting processing, said net having said wiring segment expected to cause said damage is detected and, in said antenna error preventing cell connecting processing, said antenna error preventing cell is connected to the detected wiring segment.

12. An antenna damage prevention controlling program to be executed by a computer for realizing functions of an large-scale integrated circuit designing system for carrying out layout design by inputting information about configurations of circuits internally formed in each large-scale integrated circuit comprising metal insulator semiconductor transistors, said program being in a readable memory or storage, in an actual computing element, comprising:

a gate size correcting unit to detect a wiring segment expected to cause a damage to a gate insulating film of each of said metal insulator semiconductor transistors due to an antenna effect that said wiring segment absorbs electric charges generated during plasma etching processes and to correct, based on a result from specified simulation or from specified experiment, an area of a gate electrode of each of said metal insulator semiconductor transistors connected to the detected wiring segment so as to become a value that enables the prevention of said damage, said gate size correcting unit comprising:

a sizing candidate table creating unit to store correction candidate values to be used for correction of an area of said gate electrode in ascending order for every type of a cell corresponding to said circuit configurations to create a sizing candidate cell table;

an antenna error net detecting unit to detect a net having said wiring segment expected to cause said damage;

a gate pin/cell recognizing unit to recognize a gate pin connected to said net and a type of a cell corresponding to said gate pin; and a cell sizing unit to judge whether or not said damage is able to be prevented by using said correction candidate values in ascending order stored in said sizing candidate cell table based on a specified judgment standard and to correct an area of said gate electrode by using a minimum value that enables the prevention of said damage.

13. A large-scale integrated designing system for carrying out layout design by inputting information about configurations of circuits internally formed in each large-scale integrated circuit comprising metal insulator semiconductor transistors, comprising:

a gate size correcting means to detect a wiring segment expected to cause an damage to a gate insulating film of each of said MIS transistors due to an antenna effect that said wiring segment absorbs electric charges generated during plasma etching processes and to correct, based on a result from specified simulation or from specified experiment, an area of a gate electrode of each of said MIS transistors connected to the detected wiring segment so as to become a value that enables the prevention of said antenna damage, said gate size correcting means comprising:

a sizing candidate table creating means to store correction candidate values to be used for correction of an area of said gate electrode in ascending order for every type of a cell corresponding to said circuit configurations to create a sizing candidate cell table;

an antenna error net detecting means to detect a net having a wiring segment expected to cause said damage;

a gate pin/cell recognizing means to recognize a gate pin connected to said net and a type of a cell corresponding to said gate pin; and a cell sizing means to judge whether or not said antenna damage is able to be prevented by using said correction candidate values in ascending order stored in said sizing candidate cell table based on a specified judgment standard and to correct an area of said gate electrode by using a minimum value that enables the prevention of said damage.

14. The large-scale integrated circuit designing system according to claim 13, wherein said large-scale integrated circuit comprises a plurality of wiring layers and wherein said antenna error net detecting means is configured to detect a net having a wiring segment expected to cause said damage and wherein said cell sizing means is configured to judge, for every wiring layer, whether a ratio of a sum total of metal areas to a sum total of an area of said gate electrode contained in a wiring layer is not larger than a predetermined reference value and judges, when said ratio is not larger than said reference value, said antenna damage as being able to be prevented.

15. A large-scale integrated circuit designing system for carrying out layout design by inputting information about configurations of circuits internally formed in each large-scale integrated circuit comprising metal insulator semiconductor transistors, comprising:

an antenna error preventing means to detect a wiring segment expected to cause damage to a gate insulating film of each of said MIS transistors due to an antenna effect in which said wiring segment absorbs electric charges generated during plasma etching processes and to connect, based on a result from a specified simulation or from a specified experiment and via said wiring segment, an antenna error preventing cell to provide a specified gate area and to diffuse electric charges absorbed in said wiring segment to a gate electrode of each of said MIS transistors connected to the detected wiring segment in number that enables the prevention of said damage, said antenna error preventing means comprising:

a sizing candidate table creating means to store correction candidate values to be used for correction of an area of said gate electrode in ascending order for every type of a cell corresponding to said circuit configurations to create a sizing candidate cell table;

an antenna error net detecting means to detect a net having a wiring segment expected to cause said damage;

a gate pin/cell recognizing means to recognize a gate pin connected to said net and a type of a cell corresponding to said gate pin; and a cell sizing means to judge whether or not said antenna damage is able to be prevented by using said correction candidate values in ascending order stored in said sizing candidate cell table based on a specified judgment standard and to correct an area of said gate electrode by using a minimum value that enables the prevention of said damage.

16. The large-scale integrated system according to claim 15, wherein said antenna error preventing means comprises:
an antenna error preventing cell connecting means to connect said antenna error preventing cell to the detected wiring segment.

17. The large-scale integrated circuit designing system according to claim 16, wherein said large-scale integrated circuit comprises a plurality of wiring layers and wherein said antenna error net detecting means is configured to detect, for every wiring layer, a net having a wiring segment expected to cause said damage and wherein said antenna error preventing cell connecting means is configured to connect, for every wiring layer, said antenna error preventing cell to each of detected wiring segments.

* * * * *